United States Patent
Ullman et al.

(10) Patent No.: US 10,031,950 B2
(45) Date of Patent: Jul. 24, 2018

(54) PROVIDING ADVANCED CONDITIONAL BASED SEARCHING

(71) Applicant: III Holdings 2, LLC, Wilmington, DE (US)

(72) Inventors: David G. Ullman, Corvallis, OR (US); D. David Nason, Bainbridge Island, WA (US); Michael G. Klasen, Lake Oswego, OR (US); Richard A. Lazar, Portland, OR (US)

(73) Assignee: III Holdings 2, LLC, Wilmington, DE (US)

( * ) Notice: Subject to any disclaimer, the term of this patent is extended or adjusted under 35 U.S.C. 154(b) by 34 days.

(21) Appl. No.: 14/013,342

(22) Filed: Aug. 29, 2013

(65) Prior Publication Data

US 2014/0067795 A1  Mar. 6, 2014
US 2016/0210288 A9  Jul. 21, 2016

Related U.S. Application Data

(63) Continuation-in-part of application No. 13/353,181, filed on Jan. 18, 2012, now abandoned, and a continuation-in-part of application No. 13/353,191, filed on Jan. 18, 2012, and a continuation-in-part of application No. 13/353,200, filed on Jan. 18, 2012, now abandoned, and a continuation-in-part of application No. 13/353,207, filed on Jan. 18, 2012, now abandoned, and a continuation-in-part of application No. 13/353,219, filed on Jan. 18, 2012, now abandoned, and a continuation-in-part of application No. 13/353,226, filed on Jan. 18, 2012, now abandoned.

(Continued)

(51) Int. Cl.
G06F 17/30 (2006.01)
G06Q 30/06 (2012.01)

(52) U.S. Cl.
CPC .... G06F 17/3053 (2013.01); G06F 17/30867 (2013.01); G06Q 30/0625 (2013.01); G06Q 30/0627 (2013.01)

(58) Field of Classification Search
CPC ............. G06F 17/30867; G06F 17/3053
USPC ........................................ 707/732
See application file for complete search history.

(56) References Cited

U.S. PATENT DOCUMENTS 6,018,735 A    1/2000   Hunter
6,631,362 B1  10/2003   Ullman et al.
(Continued)

OTHER PUBLICATIONS

Non-Final Rejection, U.S. Appl. No. 13/353,191, dated Jun. 30, 2014.

(Continued)

*Primary Examiner* — Cam-Y Truong
(74) *Attorney, Agent, or Firm* — Volpe and Koenig, P.C.

(57) ABSTRACT

A computer querying stored information by application of a user-defined importance condition, a preference probability in relation to a user-defined preference condition, and a user-defined target condition is provided. The computer may perform a search operation, filtering operation, and matching operation based on a result of the querying and generate a search result, filtering result, and matching result. The computer may also generate an indication of a ranking of the search result, filtering result, and matching result.

24 Claims, 41 Drawing Sheets

Related U.S. Application Data

(60) Provisional application No. 61/461,539, filed on Jan. 18, 2011.

(56) References Cited

U.S. PATENT DOCUMENTS

| | | | |
|---|---|---|---|
| 6,714,929 | B1 | 3/2004 | Micaelian et al. |
| 6,859,798 | B1 | 2/2005 | Bedell et al. |
| 6,912,568 | B1* | 6/2005 | Nishiki et al. ............... 709/223 |
| 7,229,247 | B2 | 6/2007 | Durocher et al. |
| 7,272,586 | B2 | 9/2007 | Nauck et al. |
| 7,383,236 | B2 | 6/2008 | Jin et al. |
| 7,624,083 | B2 | 11/2009 | Micaelian et al. |
| 7,693,906 | B1* | 4/2010 | Amidon et al. ............ 707/749 |
| 7,707,206 | B2 | 4/2010 | Encina et al. |
| 7,792,750 | B2 | 9/2010 | Moeller |
| 7,836,057 | B1 | 11/2010 | Micaelian et al. |
| 2003/0115192 | A1 | 6/2003 | Kil et al. |
| 2004/0254928 | A1 | 12/2004 | Vronay et al. |
| 2005/0102275 | A1 | 5/2005 | Kinstrey et al. |
| 2005/0209951 | A1 | 9/2005 | Aron et al. |
| 2006/0036512 | A1 | 2/2006 | MacCarthy et al. |
| 2006/0106809 | A1* | 5/2006 | Faltings et al. ................ 707/10 |
| 2007/0136276 | A1* | 6/2007 | Vella ................ G06F 17/30867 |
| 2008/0288430 | A1* | 11/2008 | Friedlander et al. ........... 706/46 |
| 2008/0301551 | A1* | 12/2008 | Gluck ........................... 715/700 |
| 2009/0089381 | A1 | 4/2009 | Anderson et al. |
| 2009/0299852 | A1* | 12/2009 | Tsuchiya .................... 705/14.45 |
| 2009/0299998 | A1* | 12/2009 | Kim ................................ 707/5 |
| 2010/0023382 | A1* | 1/2010 | Fushimi ............ G06F 17/30702 705/7.29 |
| 2010/0169343 | A1* | 7/2010 | Kenedy ............. G06F 17/30867 707/758 |
| 2010/0275165 | A1 | 10/2010 | Koster |
| 2010/0318520 | A1* | 12/2010 | Loeb et al. .................... 707/743 |
| 2011/0145227 | A1 | 6/2011 | Kenthapadi et al. |
| 2011/0196855 | A1 | 8/2011 | Wable et al. |
| 2011/0288921 | A1 | 11/2011 | King |
| 2011/0314006 | A1* | 12/2011 | Sweeney et al. .............. 707/723 |

OTHER PUBLICATIONS

Non-Final Rejection, U.S. Appl. No. 13/353,226, dated Jun. 6, 2013.
Non-Final Rejection, U.S. Appl. No. 13/353,219, dated May 23, 2013.
Non-Final Rejection, U.S. Appl. No. 13/353,207, dated May 9, 2013.
Non-Final Rejection, U.S. Appl. No. 13/353,200, dated May 9, 2013.
Non-Final Rejection, U.S. Appl. No. 13/353,181, dated Mar. 29, 2013.
Non-Final Rejection, U.S. Appl. No. 13/353,191, dated Mar. 31, 2015.
Ullman et al., "Trade Studies with Uncertain Information," Sixteenth Annual International Symposium of the International Council on Systems Engineering (INCOSE), pp. 1-16 (Jul. 2006).

* cited by examiner

3500

| Match | Camera |
|---|---|
| 85.6% | Panasonic Lumix DMC-FH5<br>• Buy new: $155 (lowest prices - from: $145)<br>• Compact Camera<br>• 16.1 megapixels<br>• 4x Optical Zoom<br>• 1/1600 max shutter speed<br>• 1280 x 720 movie mode<br>• 4.27oz<br>• 2.7-inch LCD Display<br>• Optical Image Stabilization<br>• Face Detection |
| 84.6% | Sony Cybershot DSC-W570<br>• Buy new: $180 (lowest prices - from: $170)<br>• Compact Camera<br>• 16.2 megapixels<br>• 5x Optical Zoom<br>• 1/1600 max shutter speed<br>• 1280 x 720 movie mode<br>• 4.09oz<br>• 2.7-inch LCD Display<br>• Optical Image Stabilization<br>• Wireless Networking |
| 83.9% | Panasonic Lumix DMC-FH25<br>• Buy new: $200 (lowest prices - from: $189)<br>• Compact Camera<br>• 16.1 megapixels<br>• 8x Optical Zoom<br>• 1/1600 max shutter speed<br>• 640 x 480 movie mode<br>• 5.61oz<br>• 2.7-inch LCD Display<br>• Optical Image Stabilization |

FIG. 36

Your current issues:

- Is Acme going to be threat to our Asian sales next year? — Yes 59%
- Should we hire Des? — Yes 33%
- The US Dollar/Yen ratio increase 3% next year? — True 78%
- How big is the French market in 2014? — 4-5M Euros 65%
- Which is best site for plant in Chattanooga? — Fern Road 65%

Add new issue  
Manage Selected Issue  
Selected Issue Details  
Search Archived Issues  
Add existing model Meaning of colors:
- Too little information — don't believe this result
- Information inconclusive — needs your attention
- Information points to this answer

Current issue:

Is Acme going to be threat to our Asian sales next year?

Define detailed measures:

Sales targets for next year
Increase in sales effort in Asia next year
Plans for new product introduction What is the form of the answer?

☒ Yes/No
☐ True/False
☐ Good/Bad
☐ High/Low

☐ Options

Option 1 =
Option 2 =
Option 3 =

Select Colleagues to ask:

John Morse
Peg Francis
John

Send request

Return to Dashboard

Cancel

FIG. 51

Current issue:

Is Acme going to be threat to our Asian sales next year?

Found data

| | Yes | Certainty |
|---|---|---|
| Business in Asia | 10% | 90% |
| Acme Expands | 60% | 70% |
| Acme to develop new product | | Needs Evaluation |

Colleague inputs

| | No input | Yes | Certainty |
|---|---|---|---|
| John Morse | No input | - | - |
| Peg Francis | 3/15/2011 | 45% | 58% |
| John | 13/17 2011 | 65% | 77% |

Archive and Report
Return to Dashboard
Cancel

PROVIDING ADVANCED CONDITIONAL BASED SEARCHING

CROSS-REFERENCE TO RELATED APPLICATIONS

This application is a continuation-in-part of each of the following: U.S. patent application Ser. No. 13/353,181, U.S. patent application Ser. No. 13/353,191, U.S. patent application Ser. No. 13/353,200, U.S. patent application Ser. No. 13/353,207, U.S. patent application Ser. No. 13/353,219, and U.S. patent application Ser. No. 13/353,226, all of which were filed on Jan. 18, 2012, and all of which claim the benefit of U.S. Provisional Patent Application Ser. No. 61/461,539, which was filed on Jan. 18, 2011. The content of each of the listed applications is hereby incorporated by reference herein in its entirety.

TECHNICAL FIELD

The disclosed technology relates generally to searching, filtering and matching and, more particularly, to sophisticated tools and techniques to be used in connection with various types of searches, filterings and matches including, but not limited to, operations spanning multiple data sources and/or online operations.

BACKGROUND

For many people, Google is synonymous with online searching due to its impressive 60% share of the Internet search market. What is less well understood is the fact that most of the world's approximately 800 billion gigabytes of data is inaccessible to any Internet search engine because it resides in inaccessible databases, is unstructured and therefore not machine readable, or requires more search effort to find than its perceived value, a problem that will be referred to herein as search friction.

Search friction is made worse in several ways: by the rapid increase in searchable data made possible by engines like Google being applied to unstructured data, by the increase in data accessibility via the web, and by the fundamental increase in amount of data being created and stored. Search friction is minimal when a search process works well and becomes intolerably large when the process entirely fails to achieve desired results. The 2010 Nobel Prize for Economics was awarded to scholars who identified search friction as a major economic problem for employment and other important markets.

Existing data construct models underlying user queries and data store design possess inherent limitations impacting how data is captured, retrieved, analyzed and presented. Current systems can only support two types of information: text (and text strings) and numbers combined using very simple logic: AND, OR, NOT, <, >, =, and mathematical functions. These constrained data constructs lead to a number of significant challenges.

Current information systems lack the ability to express and model targets, preferences, importance, beliefs, and estimates—the fundamental parts of human discourse—when leveraging technology to search, match, filter, forecast, evaluate and decide. Further, with increasing movement toward crowd sourcing and social networks, there is a correspondingly growing lack of ability to express and fuse multiple targets, preferences, importance, beliefs, and estimates.

E-commerce solutions have suffered many limitations over the years. For example, many search tools only allow searches for specifically defined items. Said search tools provide no mechanism for the user to express uncertainty in their query and provide no mechanism to express or capture uncertainty in the stored data. Indeed, search tools that do not recognize these uncertainties provide significantly fewer useful results, if any, to users.

For example, employers typically want to find the best possible job candidates. If they set search requirements too tight, the search result is usually empty. If they set search requirements too loosely, however, then there are often too many resumes to read and too little guidance for closure. On the flip side, job seekers generally want to find the best possible position. If they set their desires to high, they will likely find no positions. If they set their desires too low, however, they generally undervalue themselves.

Current systems tend to limit both employers and prospective employees to expressing information as deterministic, i.e., single-valued values. While some information includes single-valued, demographic facts, e.g., age, years in last job, etc., much important information that expresses both parties' preferences, targets, importance, beliefs, and estimates, are not expressed well, if at all, in this manner. Similar limitations persist in other areas such as social networking applications and websites, for example.

Thus, there remains a need for improved searching and search-related tools and techniques, particularly with regard to matching engines as pertaining to areas such as employment and social networking.

Today's social networking sites often provide users with an overwhelming amount of information via a social stream. Unfortunately, current filters typically fail to perform in accordance with users' desires. For example, some filters only put the most recent entries first and other filters only put the most popular items at the top. Certain filters merely apply simple keyword filtering techniques. These mechanisms, whether performed singly or in combination with each other, do not meet today's user demands and expectations because they lack the ability to enable users to filter and order social streams based on user targets, preferences, and importance.

Email is another area that would greatly benefit from improved filter mechanisms. For example, email providers and applications such as Yahoo and Microsoft Outlook merely provide simple filters such as filtering messages by information in the "From" and/or "To" fields as well as "begins with," "ends with," or "contains" with regard to the body or other portions of the message. Google may allow a user to personalize his or her news as received from Google but Google does not order a newsfeed by users' choices. Email applications lack the ability to enable users to filter and order messages based on user targets, preferences, and importance.

Thus, there remains a need for improved filtering tools and techniques, particularly with regard to social networking applications, email applications, and websites.

Traditional situation awareness systems are configured to allow users and companies to manage sales opportunities by creating and linking opportunity records to specific accounts, and track opportunities, including percent chance of close, opportunity value, and all associated data. User-defined fields may be added to each opportunity record and interactions, such as follow-up phone calls and onsite meetings, may be scheduled into an existing calendar. Such systems may maintain a complete history of activities with specific notes about each opportunity. Various items such as appointments, tasks, notes, documents, e-mails, and activities to specific sales opportunities may all be created and linked, and reports on sales funnel and opportunity progress may be generated and disseminated accordingly.

However, true situation awareness requires a complete perception of the environment, something that can only be attained by searching for information in data stores described by preferences, targets, and importance, and capturing estimates and beliefs of subject matter experts, colleagues, and other available information sources. Also, obtaining such information is only the beginning—systems and people must be able to adequately analyze and comprehend the meaning of such information by understanding uncertainty and risk inherent in the results and understanding what additional information is needed and the associated cost/benefit trade-off, for example. Current systems fail to do any of this, let alone project understanding into the future to anticipate what might happen and using the information to support choosing a course of action.

Thus, there remains a need for improved situation awareness tools and techniques.

Thus, there remains a need for improved searching and search-related tools and techniques, particularly with regard to unstructured data.

BRIEF DESCRIPTION OF THE DRAWINGS

FIG. 36 illustrates an example of a set of search results stemming from use of the user interface of FIG. 35 in accordance with certain embodiments of the disclosed technology.

FIG. 48 illustrates an example of a situation awareness dashboard in accordance with certain embodiments of the disclosed technology.

FIG. 51 illustrates an example of a request for details interface in accordance with certain embodiments of the disclosed technology.

FIG. 52 illustrates an example of an issue detail interface in accordance with certain embodiments of the disclosed technology.

DETAILED DESCRIPTION

Implementations of the disclosed technology pertain to various types of searching and search-related tools and techniques. Embodiments may serve to revolutionize how information systems capture, retrieve, analyze, and present quantitative and qualitative data and also offer unique and significant value across a number of vertical segments that may be very large. In contrast to traditional information systems that are capable of analyzing only text and numbers in binary fashion with the constraints of AND, OR, NOT, =, <, > relationships between data elements, implementations of the disclosed technology may be leveraged to manage uncertain data constructs including targets, preferences, importance, beliefs and estimates in addition to text and numbers, and to include the input or objectives of multiple people.

Exemplary Systems and Devices

Figure 1:
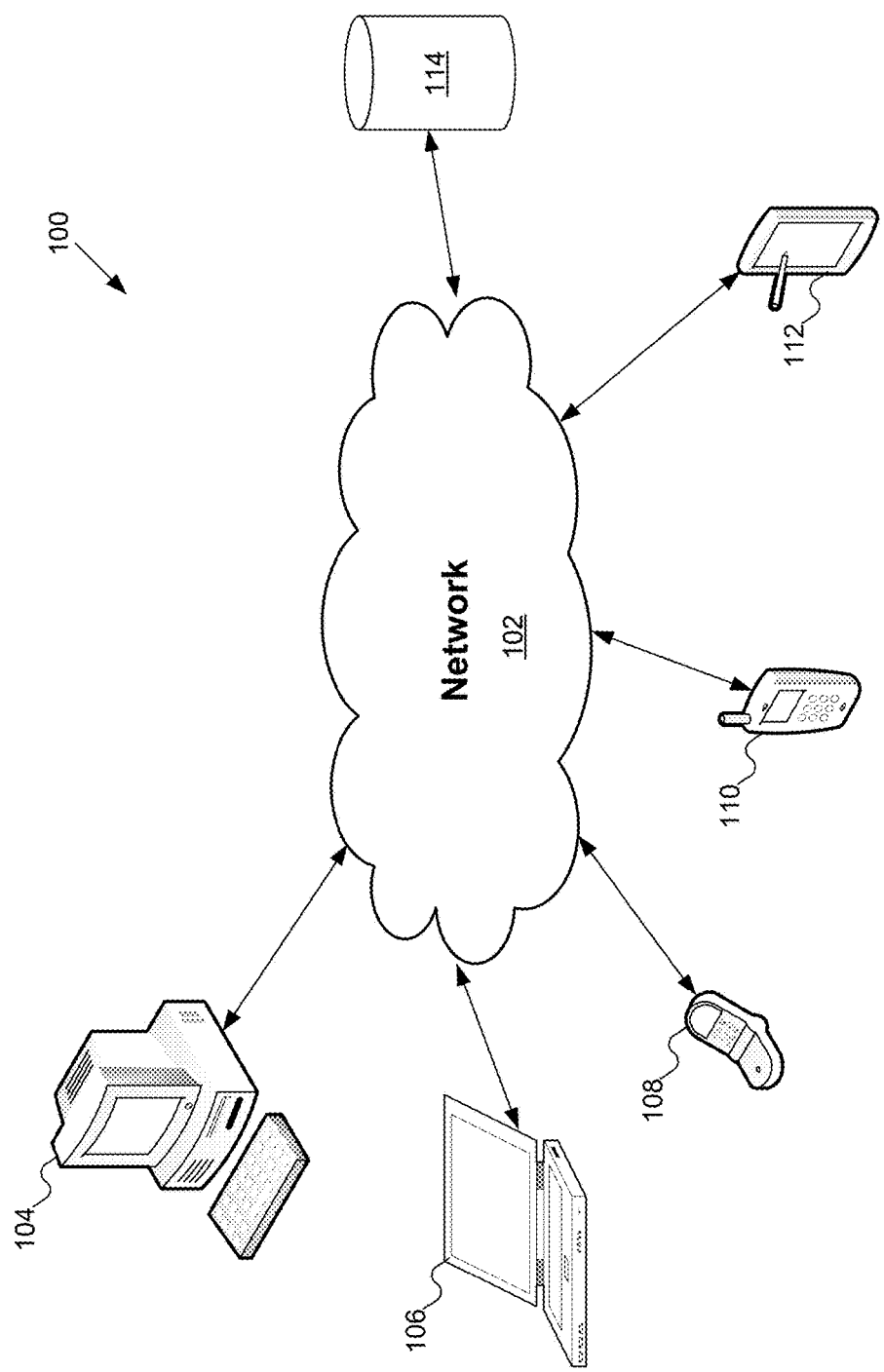
FIG. 1 is a block diagram illustrating an example of a networked system in accordance with certain embodiments of the disclosed technology.

FIG. 1 is a block diagram illustrating an example of a networked system 100 in accordance with certain embodiments of the disclosed technology. In the example, the system 100 includes a network 102 such as the Internet, an intranet, a home network, or any combination thereof. Personal computers 104 and 106 may connect to the network 102 to communicate with each other or with other devices connected to the network.

The system 100 also includes three mobile electronic devices 108-112. Two of the mobile electronic devices 108 and 110 are communications devices such as cellular telephones or smartphones. Another of the mobile devices 112 is a handheld computing device such as a personal digital assistant (PDA) or tablet device. A remote storage device 114 may store some of all of the data that is accessed and used by any of the computers 104 and 106 or mobile electronic devices 108-112.

Figure 2:
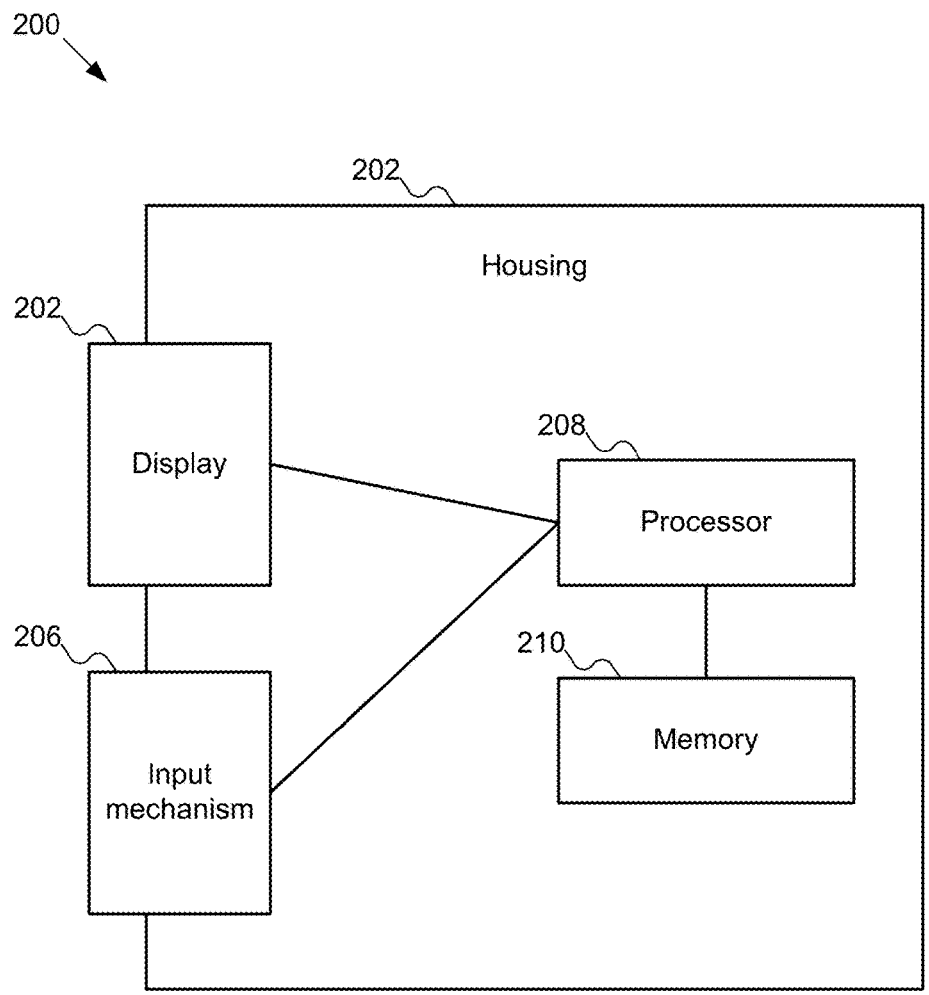
FIG. 2 illustrates an example of an electronic device in which certain aspects of various embodiments of the disclosed technology may be implemented.

FIG. 2 illustrates an example of an electronic device 200, such as the devices 104-112 of the networked system 100 of FIG. 1, in which certain aspects of various embodiments of the disclosed technology may be implemented. The electronic device 200 may include, but is not limited to, a personal computing device such as a desktop or laptop computer, a mobile device such as a handheld or tablet computing device, a mobile communications device such as a smartphone, or an industry-specific machine such as a self-service kiosk or automated teller machine (ATM).

The electronic device 200 includes a housing 202, a display 204 in association with the housing 202, a user interaction mechanism 206 in association with the housing 202, a processor 208 within the housing 202, and a memory 210 within the housing 202. The user interaction mechanism 206 may include a physical device, such as a keyboard, mouse, microphone, speaking, or any combination thereof, or a virtual device, such as a virtual keypad implemented within a touchscreen. The processor 208 may perform any of a number of various operations. The memory 210 may store information used by or resulting from processing performed by the processor 208.

Examples of Record Satisfaction Searching Techniques

Certain embodiments of the disclosed technology directly address the issue of search friction by closing the gap between search objectives and the results generated by the search process. This may be accomplished by enabling users to accurately describe their search objectives and by assuring that those objectives are accurately reflected in the search results. Such embodiments may also provide superior record identification, search analysis, results visualization, feedback, and tuning capabilities that support an improved discovery process. This may serve to address the search friction problem of efficiency of information discovery when the desired data represents a small portion of all data searched.

As used herein, a structured database generally refers to a database of records that is either created directly by human, machines, or techniques that impose structure upon unstructured data. These records may describe information or data about an object (e.g., a person, his or her beliefs, a physical entity, or an organization) or they may describe a search objective, e.g., a description of the data desired to be found. In some cases, a record may have both data and search objective(s) as described below.

In a standard search, the typical effort is to find data records that match a search objective. Each record is usually composed of fields of information where each field describes a characteristic of the record that is either textual or numerical. A search objective generally refers to a description of a field in terms of text strings or numerical values that describe the records that are being sought. In traditional database searches, a record's value must perfectly match one or more of the search objective values for the record to be identified as a match. If there are multiple fields, then matches must occur in all of the fields for the record to be identified as completely matching the search objective. This type of "match" search is generally brittle resulting in search friction.

As used herein, the term "brittle" generally refers to the inability of a search process to comprehensively and/or accurately describe the desired search result. This typically leads to any of a number of undesirable situations such as the generation of a null set of search results, only partially desired search results, or a large number of search results that must be manually inspected or otherwise processed to find desired results.

The more brittle a search process is, the larger the gap will be between the desired search results and the actual search results, and the more search friction there will be. Certain embodiments of the disclosed technology may reduce or eliminate the brittleness of search processes and, therefore, significantly reduce search friction.

Figure 3:
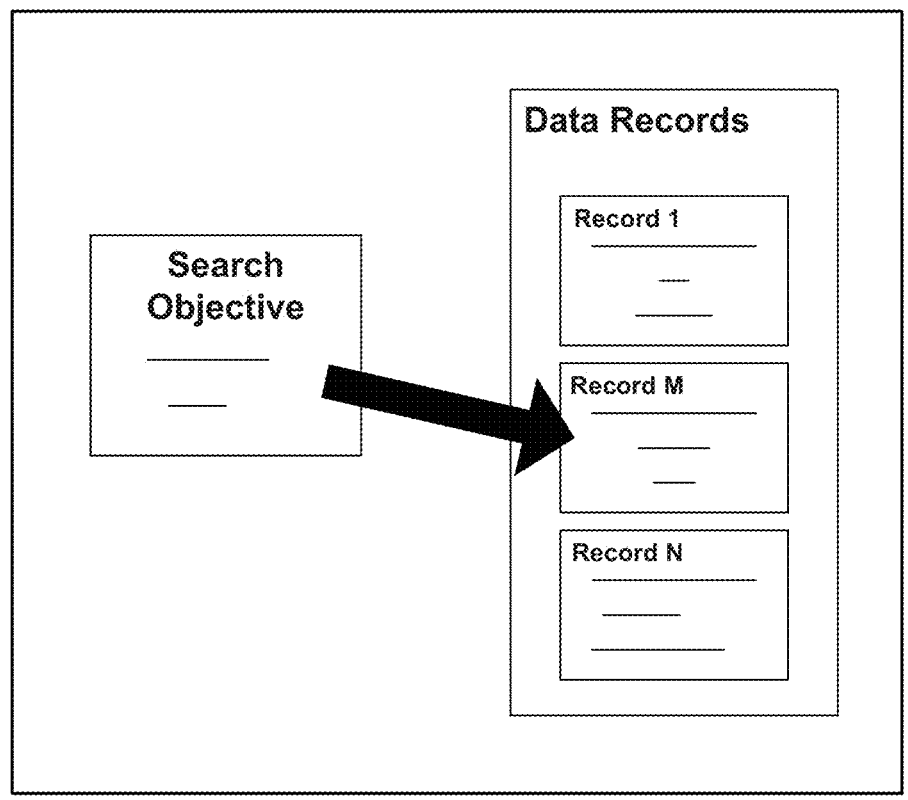
FIG. 3 illustrates an example of a standard search or "one-way search."

FIG. 3 illustrates an example of a standard search or "one-way search" 300 as described above. In the example, each line in the search objective or record data represents a piece of information in a field, whose values (either textual or numerical) need to be matched. In the diagram, the lines represent different fields and the search objective fields match those in Record M. This is the most common type of database search architecture.

Figure 4:
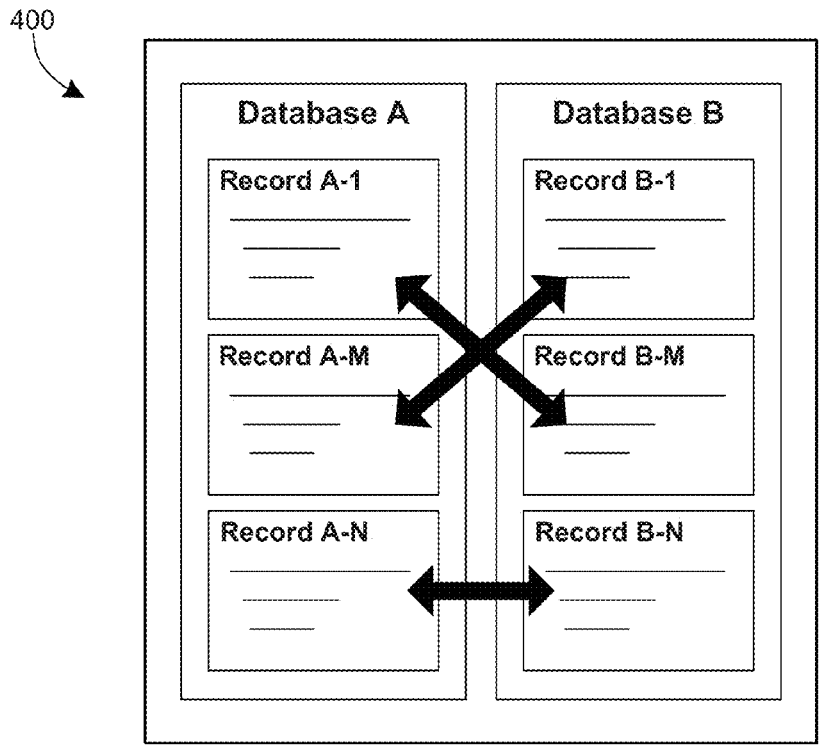
FIG. 4 illustrates an example of a two-way search in accordance with certain embodiments of the disclosed technology.

FIG. 4 illustrates an example of a two-way search 400 in accordance with certain embodiments of the disclosed technology. In the example, there are two databases (A and B) and the goal is to find which records in A best match the records in B, field for field. In other words, each data record also serves as a search objective. Databases A and B can be the same database, and there may be more than one match for each search objective in this type of search.

Figure 5:
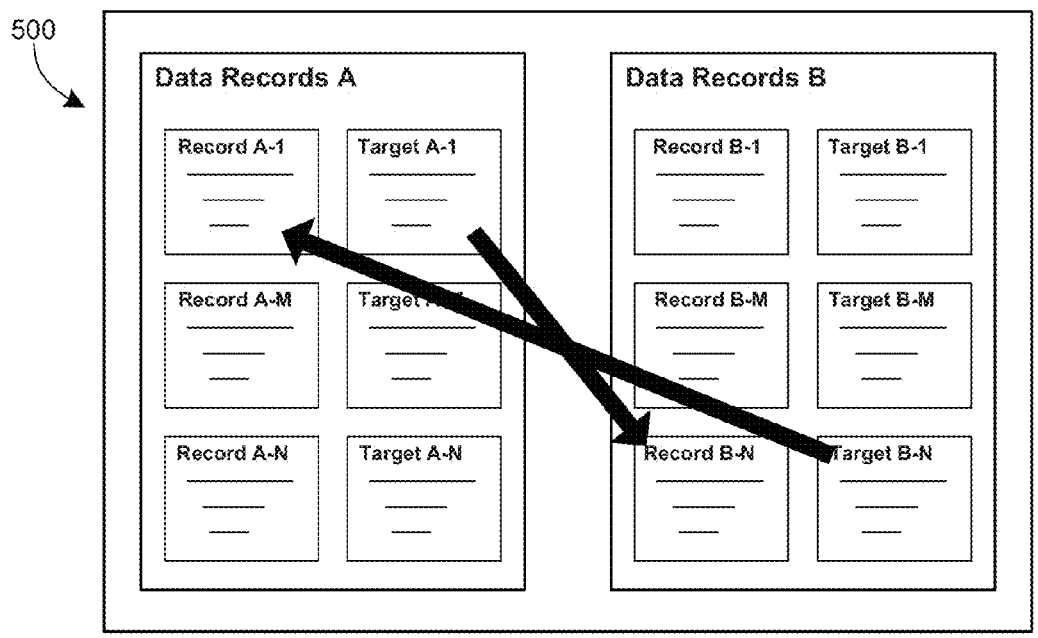
FIG. 5 illustrates an example of a multi-part search or "mutual search" in accordance with certain embodiments of the disclosed technology.

FIG. 5 illustrates an example of a multi-part search or "mutual search" 500 in accordance with certain embodiments of the disclosed technology. In the example, each record has two parts: data and a search objective. Consider an example in which a person is seeking a job. His or her record (A) can list both a description of his or her capabilities (the data) and a description of what his or her ideal position would look like (the search objective). Similarly, the other party can list the same. The multi-part search 500 may thus return the best match between the fields of the two search objectives and associated records as indicated in the diagram.

It should be noted that the data in a record or a search objective may be the result of the fusion of multiple people's input or the un-fused search objectives of a group of people. This concept is described in detail below.

Certain embodiments of the disclosed technology include the calculation of a field satisfaction (e.g., a value between 0.0 and 1.0 for each field and subsequent application of algorithms to combine these into an overall record satisfaction. Record satisfactions may range between 0.0 and 1.0, where 1.0 generally refers to a complete match and 0.0 generally refers to a complete non-match or miss. The record(s) may be ranked by record satisfaction.

In situations where there is no complete match, i.e., each record has a satisfaction less than 1.0, the record(s) with the highest satisfaction may be selected. These embodiments typically result in better defined search objectives and enable better feedback to refine search objectives. In cases where search objectives are not well known, such embodiments may provide results that enable fast feedback for every stage of the information discovery process, thus reducing or eliminating search friction by removing the brittle search problem.

Various Types of Data

In structured data, there are four main categories of information. A first type of data as used herein will be referred to as textual data and may include, but is not limited to, one-option data, multiple-option data, independent N-option data, and dependent N-option data. One-option data generally refers to a single idea or statement of fact. Multiple-option data, e.g., two-option data, generally refers to multiple ideas or statements of fact, such as "male or female," "yes or no," and "like or dislike," for example. Independent N-option data generally refers to N options that are independent of each other, e.g. list of cities, zip codes, type, or other cataloging characteristic. Dependent N-option data generally refers to N options that are linearly related by a generally understood and/or communicated characteristic such as goodness, probability, agreement, frequency, quality, etc., e.g., "Very Bad," "Bad," "Normal," "Good," and "Very Good."

Textual data may be captured by receiving a selection of structured options, e.g., instructing a user to "check Male or Female," "select Yes or No," or "enter zip code." Textual data may also be captured by the input of recognizable test strings such as a zip code, for example, or by the result of categorizing unstructured data.

Numerical data generally refers to numerical information or characteristics having units associated therewith such as age, length, or cost, for example. Numerical data may be captured by receiving a selection of structured options, e.g., instructing a user to "select height" and providing selections such as 52-56, 57-59, etc., for example. Numerical data may also be captured by the input of recognizable test strings such as height or weight, for example, or by the result of categorizing unstructured data.

Two other types of data described herein will be referred to as "beliefs" and "estimates." Belief and numerical estimate data types generally include a certainty or other qualifying data characteristics along with the primary data characteristic. Current systems reduce data to simple textual and numerical data representations. For example, some market research data capture may describe, and be limited to, demographic characteristics such as age or gender, and other measures that can be represented only as textual and numerical data. As used herein, a primary objective of that data capture may be the beliefs and estimates of respondents so that the response to current or future stimulus may be represented.

As used herein, a belief generally refers to an opinion expressed as data, e.g., a statement of some idea or principal that is represented by textual data and a certainty, knowledge, intensity, or existence characteristic. In an example where a user indicates "I am a Democrat but not a very strong one," the "not a very strong one" portion of the data string is an N-option classification of certainty. In an example where a user indicates that "I am sure the moon is made of cheese," the usage of "sure" represents a two-option classification, e.g., the moon is either made of cheese or something else. If a user indicates that "the Big Bang theory explains the origins of the universe and I believe it is true," the usage of "believe" represents an N-option classification that depends on how many options are available. Consider a numerical data example in which a user indicates that "I estimate the project will cost about $1200, maybe as little as $900, and maybe as much as $1350." In this example, use of the term "about" represents the user's certainty with respect to the project cost.

Figure 6:
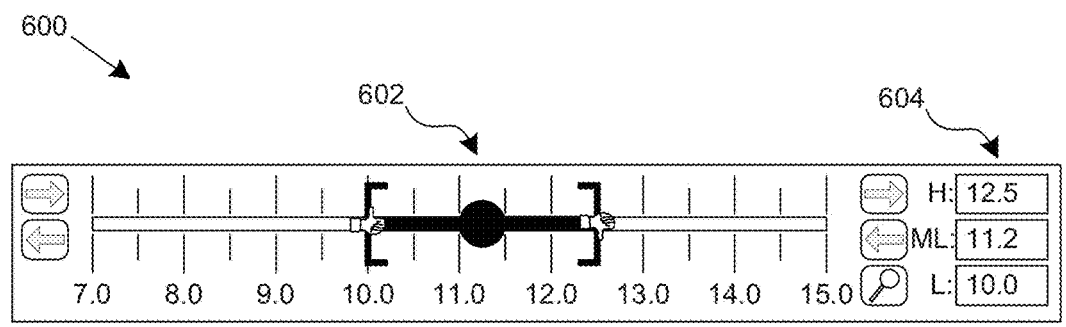
FIG. 6 illustrates an example of a number line mechanism in accordance with certain embodiments of the disclosed technology.

As used herein, an estimate generally refers to a forecast or projection of a quantitative measure that is uncertain. An estimate may be represented by numerical data with the addition of a certainty. For example, if one field of data is the cost of a proposed project, the value may be tagged with a certainty of the estimate. Such data is typically a distribution of values that can take any format ranging from simple uniform distributions to complex probabilistic functions that describe the probability of every point in the range of numerical possibilities. FIG. 6 illustrates an example of a number line mechanism 600 in accordance with certain embodiments of the disclosed technology. In the example, the number line mechanism uses a three-point distribution estimation scheme in which high, most likely, and low values may be captured through the use of a single slider 602 or the input of numerical values in designated fields 604.

Belief Maps

A belief map may be implemented in connection with belief information collection and visualization. Belief maps may be used for both the collection of and visualization of data. In certain embodiments, a user may move one or more dots on his or her belief map to capture his or her opinion on a particular matter. Multiple inputs may then be displayed to enable the user to visualize assessments across option, criteria, or people. This visualization may serve to improve the management of search results. Belief maps are described in U.S. Pat. No. 6,631,362, titled "GENERAL DECISION-MAKING SUPPORT METHOD AND SYSTEM" and issued on Oct. 7, 2003, the content of which is hereby incorporated by reference herein in its entirety.

Figure 7:
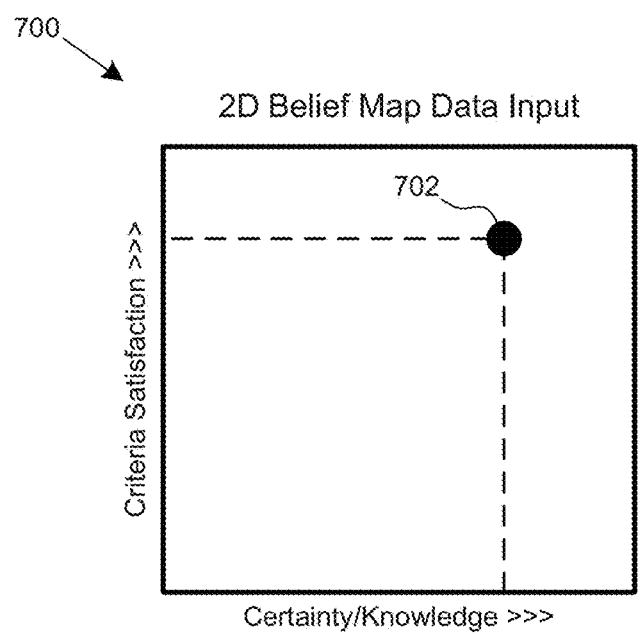
FIG. 7 illustrates an example of a belief map in accordance with certain embodiments of the disclosed technology.

FIG. 7 illustrates an example of a belief map 700 in accordance with certain embodiments of the disclosed technology. The belief map 700 shows a single point 702 plotted with the vertical axis labeled "criteria satisfaction" and the horizontal axis labeled "certainty/knowledge." In the example, the vertical axis represents a level of support and can take many forms. A point at the top of the belief map 700 may signify full support for an idea or principle and a point at the bottom of the belief map 700 may signify no support. If there are two competing options, the top may be one position and the bottom the other position. In the case of dependent N options, e.g., multiple linearly related options, the bottom may represent one extreme and the top may represent the other extreme of the range of items.

In the example, the horizontal axis of the belief map 700 represents certainty, knowledge, intensity, and/or existence. The interpretation as to what type of qualifying data is represented may be an application-specific labeling consideration to avoid confusion, but the underlying certainty treatment would remain unchanged. A point at the far right of the belief map 700 would indicate strong certainty, meaning that it is based on good knowledge or believed with strong intensity. If at the far left of the belief map 700, however, the point would be no better than the flip of a coin because it would correspond to uncertainty, e.g., based on weak knowledge or not strongly believed.

Figure 8:
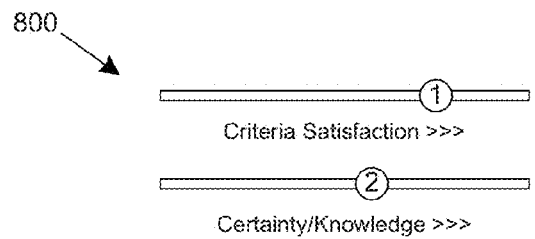
FIG. 8 illustrates an example of a two-slider mechanism in accordance with certain embodiments of the disclosed technology.

FIG. 8 illustrates an example of a two-slider mechanism 800 in accordance with certain embodiments of the disclosed technology to provide a user with an alternative input technique for belief map data capture. While the two-slider mechanism 800 is more compact in the vertical dimension than the two-dimensional belief map 700 of FIG. 7, for example, it may still capture the same information as with the belief map.

In certain implementations, the location of a belief map or slider dot is translated into a single "belief" number. This value thus simplifies the two-dimensional belief map data representation into a certainty-weighted single dimensional data format. Consider an example in which C=a criteria satisfaction that ranges from 0.0 (i.e., no support) to 1.0 (i.e., full support) and K=a knowledge value that ranges from 0.5 (i.e., the flip of a coin) to 1.0 (i.e., high certainty). The belief B may be determined using the following equation:

$$B=K*C+(1-K)*(1-C)$$

Figure 9:
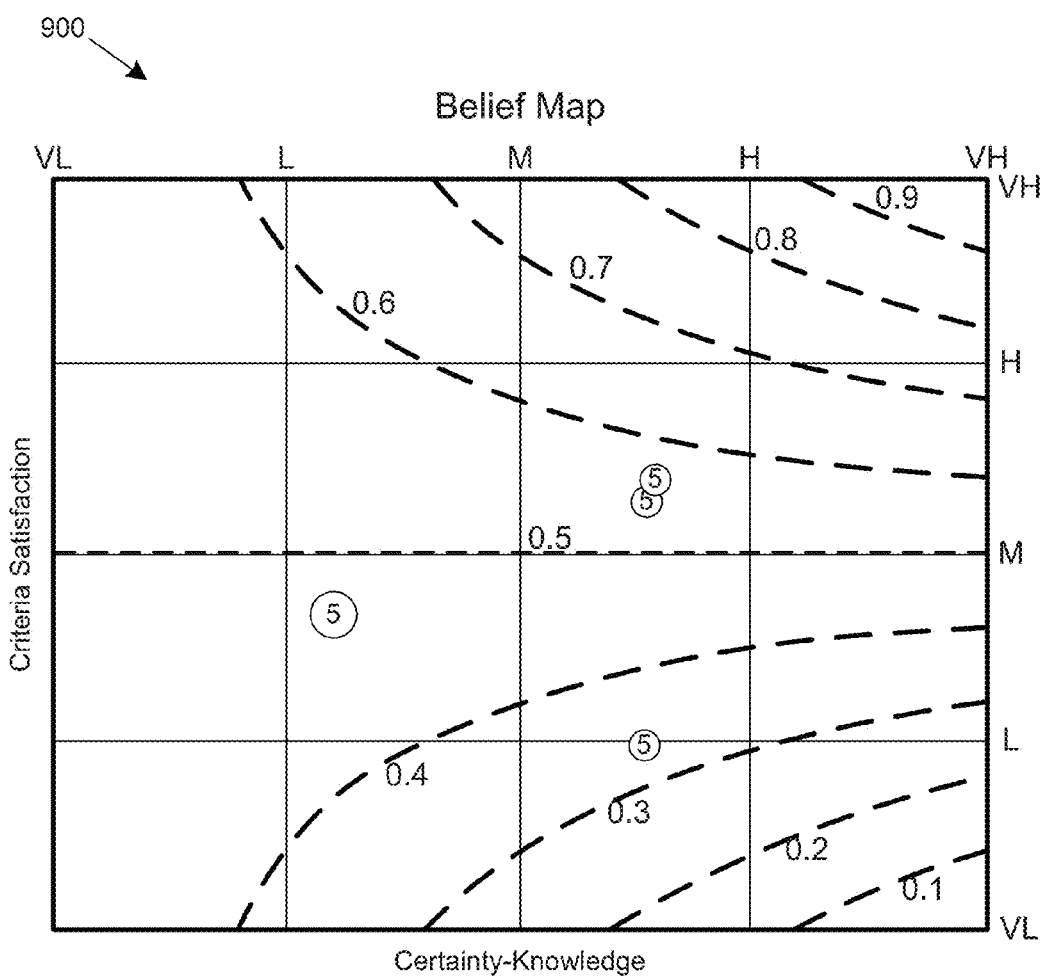
FIG. 9 illustrates an example of a belief map in accordance with certain embodiments of the disclosed technology.

FIG. 9 illustrates an example of a belief map 900 in accordance with certain embodiments of the disclosed technology. In the example, values that are calculated using the above formula are plotted as isolines. The values calculated by this formula may serve to eliminate the ability to differentiate between a condition of indecision due to complete uncertainty and a condition of indecision due to well-known alternatives being indistinguishable.

Figure 10:
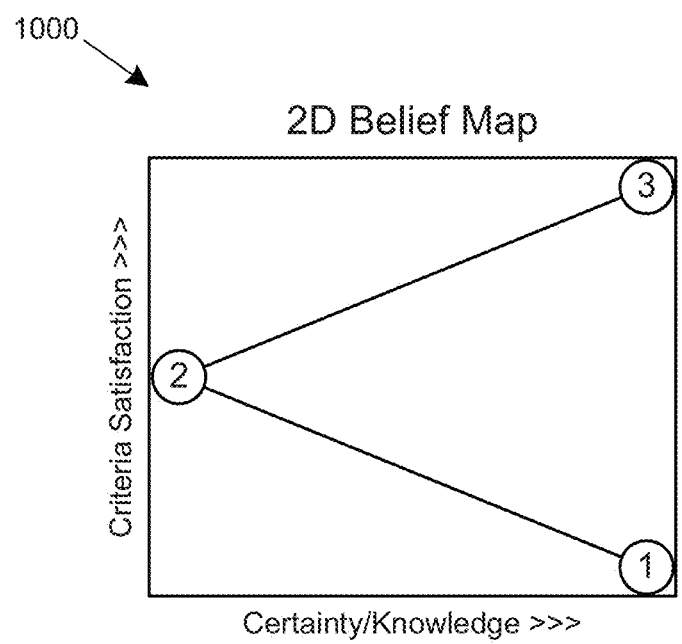
FIG. 10 illustrates an example of an approximation for a two-dimensional belief map in accordance with certain embodiments of the disclosed technology.

FIG. 10 illustrates an example of an approximation for a two-dimensional belief map 1000 in accordance with certain embodiments of the disclosed technology. The belief map 1000 may be used for data collection purposes and is estimated by a simple "V." The result and application limitation from using the V input method are generally the same as from using the single-dimension simplification of full belief map data transformed by the above belief equation. With the V input method, a single slider 1100 illustrated by FIG. 11 may be used to find the value of belief B by implementing the following equations:

$$B=1-2*(X-X^2) \text{ for } X>0.5$$

$$B=2*(X-X^2) \text{ for } X<=0.5$$

Figure 11:
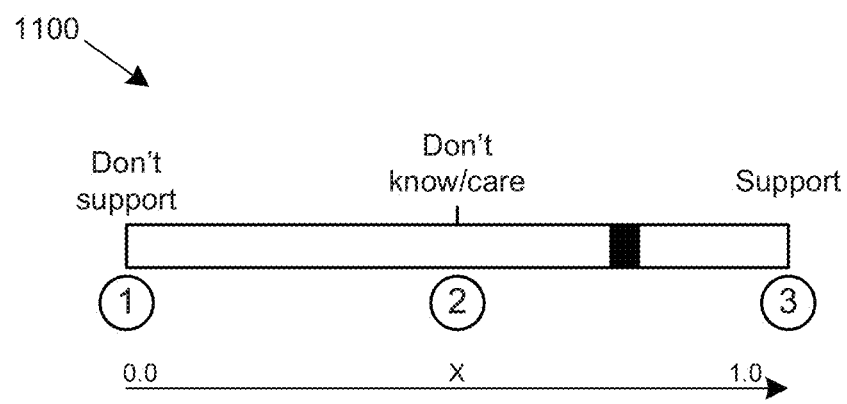
FIG. 11 illustrates an example of a slider mechanism corresponding to the two-dimensional belief map of FIG. 10.

In the example, X is the value shown on the corresponding slider 1100 of FIG. 11. The three points 1, 2, and 3 of the slider 1100 of FIG. 11 correspond to points 1, 2, and 3, respectively, in the belief map 1000 of FIG. 10. The labels "Support" and "Don't Support" may take any of a number of different forms, such as "Right or Wrong," "For or Against," or many others as required to avoid interpretation error for the specific application under consideration.

Examples of Textual Data Search Objectives

Figure 12:
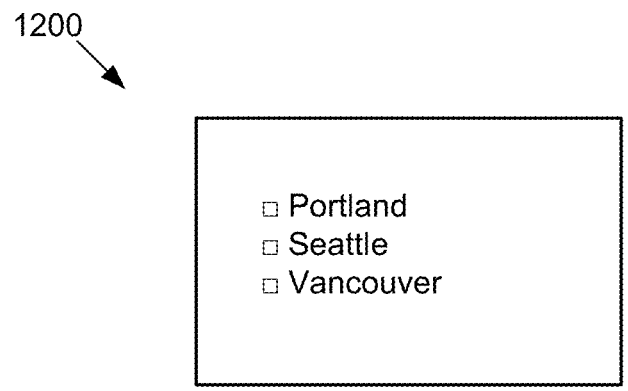
FIG. 12 illustrates an example of a traditional search interface.

Traditional searches often include boxes that can be checked to indicate whether a specific field value is to be searched for or not. For each box that is checked, the corresponding value is searched for and, if the box is not checked, the corresponding value will not be searched for. Consider an example in which a user wants to search a database for a specific person who is believed to live in Portland but may live in Vancouver and probably does not live in Seattle. FIG. 12 illustrates an example of a traditional search interface 1200 that presents to the user three search objective choices for the city: Portland, Vancouver, and Seattle.

In the example, each box in the interface 1200 is either checked or not with a search result showing everyone that matches the checked characteristic. This search is "brittle" because if "Portland" is the only box that is checked, for example, then only data records that have "Portland" will be found. There is no way to indicate the search objective preference for Portland followed by Vancouver and a lack of search desire for Seattle. The contrast between desired search objective and that which is possible to input illustrates why this type of match search is brittle.

Figure 13:
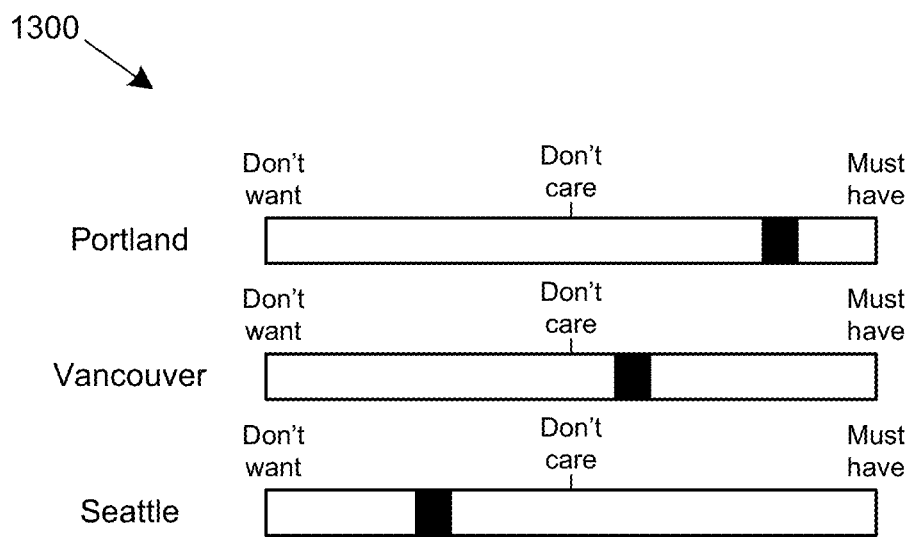
FIG. 13 illustrates an example of a search interface in accordance with certain embodiments of the disclosed technology.

FIG. 13 illustrates an example of a search interface 1300 in accordance with certain embodiments of the disclosed technology in which a combination of search objectives enables the system to measure how well a record's total range of characteristics compares to the total range of search objective characteristics. The interface 1300 is configured to overcome the search objective brittleness problem by allowing a user to specify a preference for each of the search objective needs at or between "don't want," "don't care," and "must have" using slider mechanisms. It should be noted that similar wording and/or other wording may be used as appropriate for the specific application.

With the format provided by the interface 1300, the search objective for city can be described by moving the sliders to represent the preference for each option. In the example, the default input is placed at "don't care," which may be equivalent to not checking the corresponding box in the traditional interface 1200. Moving a slider to the right end is essentially equivalent to checking the corresponding box in the traditional interface 1200. This example illustrates how the search objective of a preference for Portland followed by a preference for Vancouver and a lack of preference for Seattle may be defined.

Implicit in the example 1300 is that all "don't care" cities will have higher search satisfaction than Seattle. When all of the search results are ranked, for example, results having a "don't care" preference will typically have higher satisfaction than results with Seattle because of the negative preference for Seattle as described in the present example.

Figure 14:
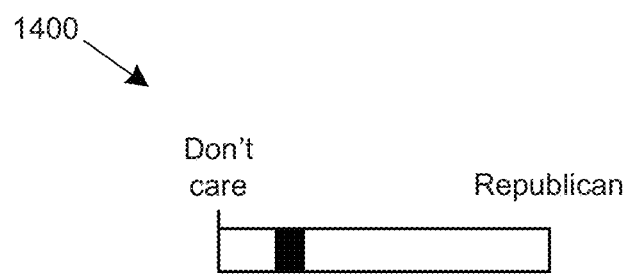
FIG. 14 illustrates an example of a one-option search objective slider mechanism in accordance with certain embodiments of the disclosed technology.

FIG. 14 illustrates an example of a one-option search objective slider mechanism 1400 in accordance with certain embodiments of the disclosed technology. While there are usually at least two choices to define a search, a one-option search may be sufficient in situations such as the present example, in which the user does not care about political affiliation but wants to give the search a disposition for Democrats.

Figure 15:
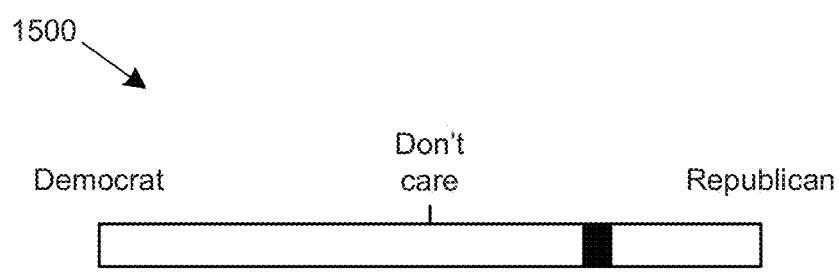
FIG. 15 illustrates an example of a two-option search objective slider mechanism in accordance with certain embodiments of the disclosed technology.

FIG. 15 illustrates an example of a two-option search objective slider mechanism 1500 in accordance with certain embodiments of the disclosed technology. Traditionally, a two-option search is generally for A or B, e.g., find all the "A"s but don't show any "B"s, and many searches may include "both" as an option. In the example, moving the slider to either end would essentially be the equivalent of the user checking a "Democrat" box or a "Republican" box, and putting the slider in the middle would essentially be the equivalent of the user checking a "Both" box. At any other location, there is a preference for one of the options over the other. In the example, there is a preference for "Republican."

Figure 16:
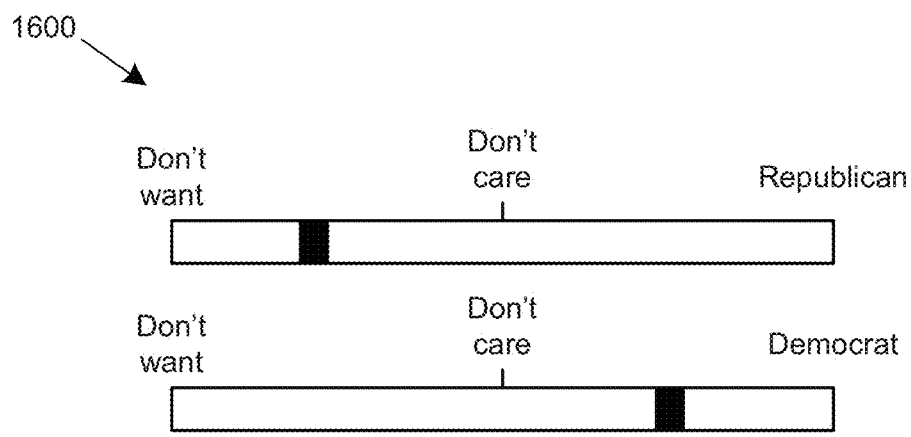
FIG. 16 illustrates an alternative embodiment of the two-option search objective slider mechanism of FIG. 15.
Figure 17:
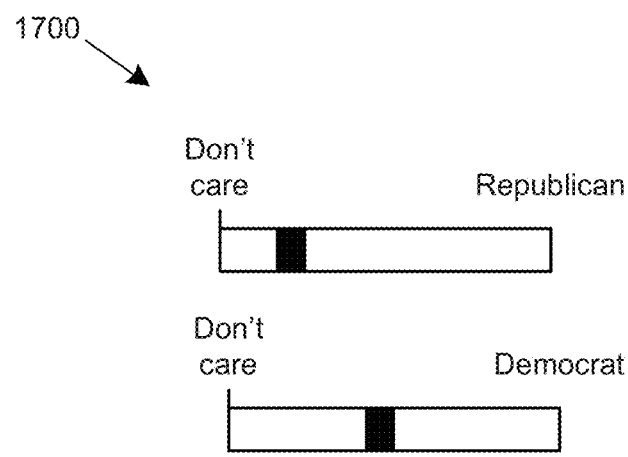
FIG. 17 illustrates an alternative embodiment of the two-option search objective slider mechanism of FIG. 16.

FIG. 16 illustrates an alternative embodiment 1600 of the two-option search objective slider mechanism 1500 of FIG. 15. In the example, a user wanting one of the two is deemed equivalent to the user not wanting the other. Thus, as the slider on one option is moved to the left, the other slider moves to the right accordingly. FIG. 17 illustrates an alternative embodiment 1700 of the two-option search objective slider mechanism 1600 of FIG. 16. In the example, the slider mechanism 1700 eliminates the "Don't want" part of the assessment from the slider mechanism 1600 of FIG. 16 and only allows for searching between "Don't care" and a positive preference.

Figure 18:
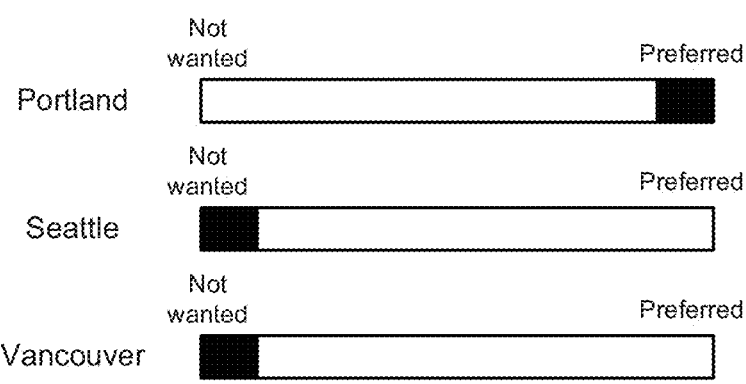
FIG. 18 illustrates an example of an independent N-option search objective slider mechanism in accordance with certain embodiments of the disclosed technology.
Figure 19:
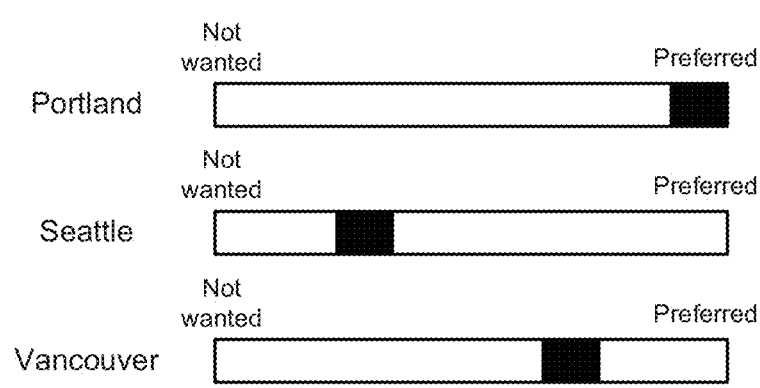
FIG. 19 illustrates an alternative example of the slider mechanism of FIG. 18.

FIG. 18 illustrates an example of an independent N-option search objective slider mechanism 1800 in accordance with certain embodiments of the disclosed technology. In the example, the user has indicated a strong preference for Portland and "Not wanted" for Seattle and Vancouver. This is the functional equivalent of checking a box for Portland and not checking boxes for Seattle or Vancouver in traditional search interfaces. FIG. 19 illustrates an alternative example 1900 of the slider mechanism 1800 of FIG. 18 in which the user has indicated that Portland is still the most desired criteria but now specifies that there is a weaker preference for Vancouver and an even weaker preference for Seattle.

Examples of Numerical Data Search Objectives

Traditional numerical data searches tend to be for a specific value, less than a value, more than a value, or across a fixed range of values, e.g., "find all people who are 55 years old," "find all people less than 5'7" tall," "find all cars that get greater than 50 mpg," and "find all cameras that cost between $101 and $200." These types of search objectives may be sufficient at times but often they are not. In reality, the search objective values given in search objective definitions are not hard edges. For example, if a user shopping for a camera provides the search objective as a range, e.g., $101 to $200, potentially good choices will likely be missed. For example, a camera that meets other search objectives, e.g., for size, capacity, and function, but costs $210 would probably be worth considering by the user but would not be listed as a result of the search, an example of search friction or brittleness. In other words, for measured search objectives there should be at least two values: a search objective comprise of target values and threshold values. In the case of the camera the search objective might be reworded to read "find all cameras that cost less than $230, ideally below $200."

Figure 20:
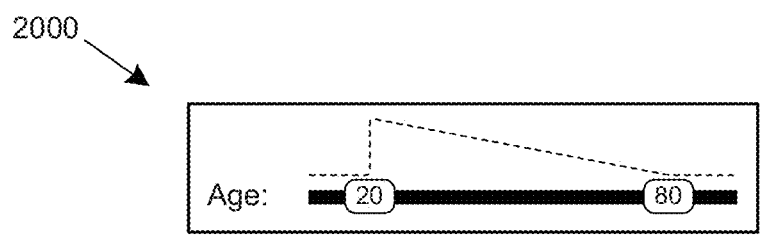
FIG. 20 illustrates a first example of numerical data searching as used by a user for an age search in accordance with certain embodiments of the disclosed technology.
Figure 21:
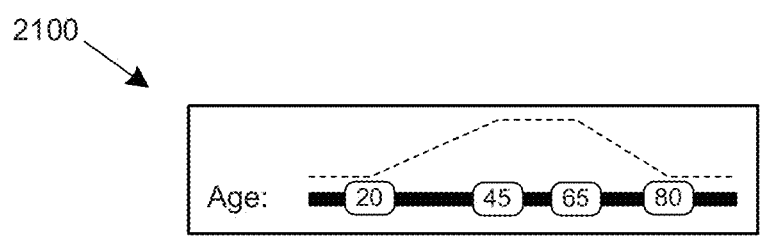
FIG. 21 illustrates a second example of numerical data searching as used by a user for an age search in accordance with certain embodiments of the disclosed technology.
Figure 22:
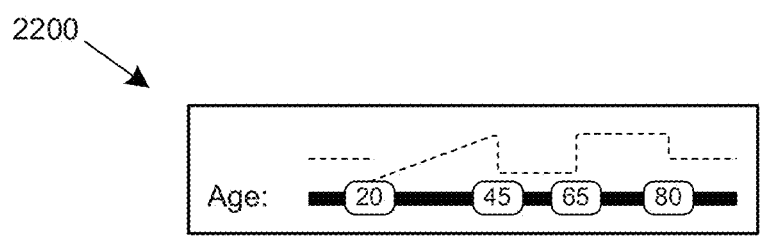
FIG. 22 illustrates a third example of numerical data searching as used by a user for an age search in accordance with certain embodiments of the disclosed technology.

FIGS. 20-22 illustrate three examples of numerical data searching 2000-2200, respectively, as used by a user for an age search in accordance with certain embodiments of the disclosed technology. In the first example 2000, the user is effectively searching for all people between the ages of 20 and 80 with a preference that is maximum at 20 and decreases toward 80. In the second example 2100, the user is effectively searching for all people ideally between 45 and 65 but as low as 20 or as high as 80. It is typically easier for a user to relate this search objective graphically by moving points on the plot. The third example 2200 communicates a very complex search objective that can be reduced to the other examples 2000 and 2100 by making the thresholds equal to the search objective values. This capability of defining both search objective values and thresholds allows for the softening of numerical search edges, thereby alleviating brittleness and easing search friction.

Examples of Belief Search Objectives

Figure 23:
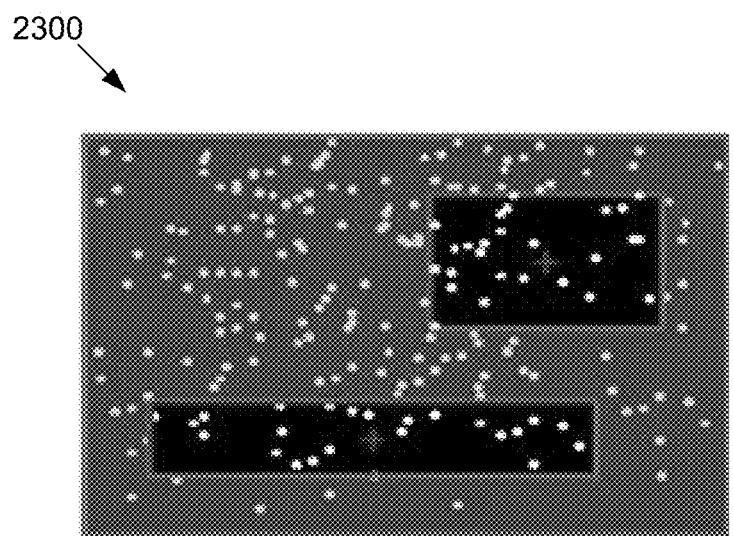
FIG. 23 illustrates an example of a regional search objective belief map in accordance with certain embodiments of the disclosed technology.

FIG. 23 illustrates an example of a regional search objective belief map 2300 in accordance with certain embodiments of the disclosed technology. In the example, a subset of responses to a single question is chosen with one or more drawn rectangles within the belief map 2300. The rectangles may be moved and adjusted. For example, a user may select a group of soft supporters and opponents for a measure. In such an example, the upper rectangle may provide a visual indication as to those who support the measure and have good certainty about it. The lower rectangle may provide a visual indication as to those who oppose the measure but may be uncertain enough that they can be swayed.

Figure 24:
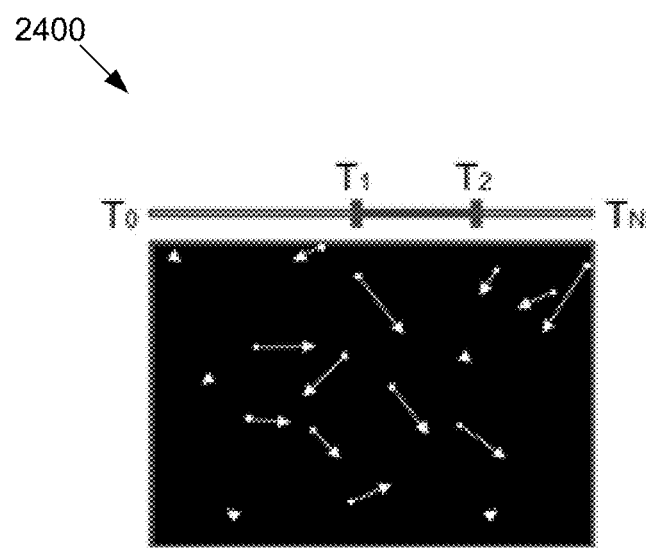
FIG. 24 illustrates an example of a time search belief map in accordance with certain embodiments of the disclosed technology.

FIG. 24 illustrates an example of a time search belief map 2400 in accordance with certain embodiments of the disclosed technology. In the example, responses may be collected at a specific time between a range that defaults to start and stop of survey as shown in the belief map 2400. In certain embodiments, time search objectives may show a sequence with responses collected in a range of time such as a visual display of how much change in response happened in a period of time, for example.

In difference objective belief maps, responses that show a selected amount of difference between two belief maps may be selected. For example, a user may select responses that have changed due to some event or new information. This difference allows for a comparison of a large number of responses to discover the beliefs and demographics of survey takers who have changed their responses.

Satisfaction Analysis

As used herein, a target generally refers to an objective for quantitative information such as "more is better," "less is better," or "target is best." In one example, a $200 item may be the objective for a user but an item priced up to $250 may be acceptable. In another example, a departure time of 3:00-3:30 may be the objective for a user but any time between 1:30 and 4:00 may be acceptable.

As used herein, a preference generally refers to an objective for qualitative information that includes certainty qualifications. Examples of a preference include: (1) "yes" is preferred over "no," (2) a trip to "Seattle" may be preferred over one to "Portland" but is not as good as one to "Vancouver," and (3) "a point and shoot camera" is preferred over an "SLR" but a "combination camera" is probably acceptable if no other type exists.

As used herein, an importance generally refers to an expression of degree of relative significance of measures where some are more highly valued than others. For example, a user may consider a zoom feature for a camera to be twice as important as megapixels and three times as important as price. In another example, a user may consider layover time to be 20 percent more important than price and price to be 60 percent more important than airline.

In traditional searches, the satisfaction for each field, $S_{fi}$, are related in an "or" fashion. That is, if the search objective matches the data in a field then $S_{fi}=1$, if not then $S_{fi}=0$. The record satisfaction $S_{record}$ for a record is simply the product of these satisfactions:

$$S_{record}=\Pi_i S_{fi}$$

The counter i goes from 1 to N, the number of fields searched. With this formula, $S_{record}$ is either 0 or 1 as either all the fields in the record are matched, i.e., $S_{record}=1.0$, or at least one of them does not, i.e., $S_{record}=0.0$. Thus, if the data in any one field does not match the search objective then the total satisfaction is 0.0.

In contrast, certain implementations of the disclosed technology use a formula to find the record satisfaction that is common in decision making but not in search. In these embodiments, the record satisfaction is the sum of the individual field satisfactions:

$$S_{record}=(\Sigma S_{fi})/N$$

where N refers to the number of search objectives and i=1 to N. Each "field satisfaction" is a probabilistic measure of value of the contribution of field data to the search objective and has a value between 0.0, i.e., no satisfaction, and 1.0, i.e., full satisfaction. This formulation allows the satisfaction with one measure to be traded off for satisfaction with another. Current systems' lack of being able to accommodate tradeoffs, which are implicit in virtually every search, leads to search friction.

The effect of this definition is to calculate a satisfaction for each record in the database, which can then be rank ordered to find which records are most satisfactory relative to the search objective. The range of evaluated records may be reduced by filtering and prior indexing. Field satisfactions may be developed for virtually all types of data and search objectives.

Tuning Techniques

One of the many benefits of searching in satisfaction space is the ability to have a value for each field satisfaction that is a distinct value between 0.0 and 1.0 rather a discrete value of 0 or 1. This range of satisfaction values provides a user with the ability to tune a search by weighting the importance of one field match relative to another. For example, a user may indicate that "I want to find a date and she should be taller than 5'6" with red hair" and that "Her height is more important than the color of her hair and I will even accept a brunette." In the example, the first sentence provides clear criteria for the search and the second sentence provides that: 1) the user has a preference for red hair followed by brunette hair and 2) height is more important than hair color to the user.

The combination of preference and importance allows for detailed tailoring of searches. In equation form, an example of the addition of tuning to a search may be represented by:

$$S_{record}=(\Sigma T_i * S_{fi})/N$$

where the tuning or weighting factors are normalized to sum to 1, $\Sigma T_i=1$.

The ability to adjust tuning allows for a user to search data through different value structures. The relative weightings defined by tuning can reflect an individual's values. In the example above, the user values height over hair color and the extent to which the user values one over the other may be reflected in the tuning values, e.g., the user could put $T_{height}=0.7$ and $T_{color}=0.3$. Should the user decide to tune out hair color altogether, he or she could put 1.0 and 0.0 for the weight and hair color, respectively.

Alternatively or in addition, tuning may provide a user with what-if tradeoff analysis, e.g., the effect of changing what is important allows for ready exploration of the search results to see how sensitive they are to slight changes in the relative importance of the field satisfaction results. For instance, removing the desire for hair color entirely in the present example would result in the maximum possible satisfaction associated with other search objectives. Knowing this value would make it possible to more quickly understand the boundaries of possible satisfaction associated with a set of search data.

Alternatively or in addition, tuning may provide a user with real-time results visualization. For example, continuous tuning may enable minor or major continuous changes in importance to generate equally continuous changes in search results. In this way, a user may adjust tuning as specific record satisfaction values change and use this source of informational feedback to track a course to the subset of records that best describe both the search objective and the best possible search objective given the range of possible data.

Fusion Techniques

The data collected in a database may be factual demographic information, e.g., gender or height, in which case there is generally no disagreement of ambiguity. On the other hand, the data may include estimates and beliefs and there may be a range of them depending on who contributed to the database. For example, consider an example in which a user wishes to assess the potential for sales in new regions. The user may ask his or her sales team to provide data for belief that sales will be successful in these different regions. They may each provide a dot on a belief map and such beliefs may be combined.

Figure 25:
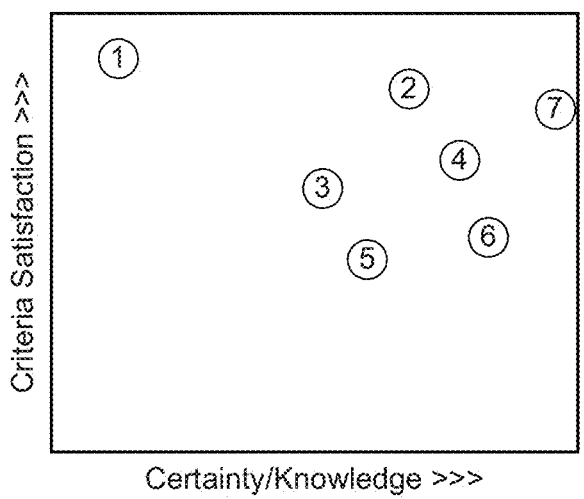
FIG. 25 illustrates an example of a belief map in accordance with certain embodiments of the disclosed technology.

FIG. 25 illustrates an example of a belief map 2500 in accordance with certain embodiments of the disclosed technology. In the example, seven responses are averaged in each of the two dimensions to find a single belief point. Using averaging, if all the respondents put their points at location 4 in the belief map 2500, then this response would be no different than one person's response at that point, which would be fine in situations where the user only wants to consider the average.

Figure 26:
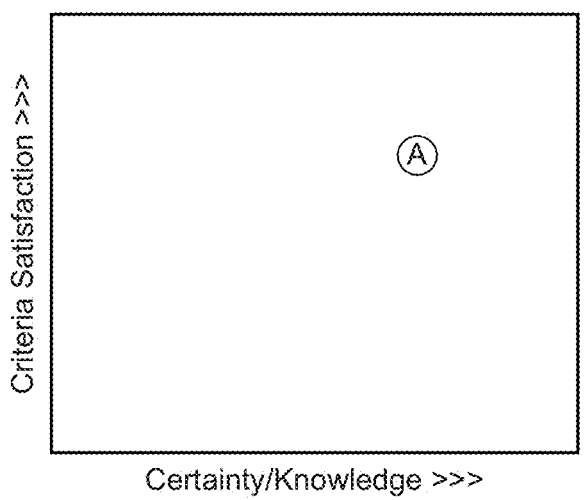
FIG. 26 illustrates an example of another belief map in accordance with certain embodiments of the disclosed technology.

FIG. 26 illustrates an example of a belief map 2600 in accordance with certain embodiments of the disclosed technology. In the example, the system assumes that two people giving support to a position with fairly high knowledge is essentially equivalent to one person giving even higher support with high knowledge. This is similar to the user asking multiple knowledgeable people for their opinions on a topic: asking enough of such people is essentially equivalent to asking one guru.

An additional fusion method includes the utilization of characteristics of an individual group of objectives to generate individually optimized search results that may then be fused at the results level. Such a technique may be referred to as "crowd sourcing" where the search desires of a group of individuals are used to find the best possible combination of results for a larger group as a whole. In this method, each person's search objective results in a satisfaction result that may be used as data to calculate the highest satisfaction for everyone. This method may result in the generation of a crowd sourced collection of highest satisfaction results at the group level and use satisfaction results as data for overriding objectives.

These fusion techniques may be particularly useful for crowd source solutions in environments where individuals have different stimulus and individual objectives, such as on a battle field or a political campaign, for example, but share a common objective that is used to determine the format of the crowd source result. Because of its individual search objective accuracy and ability to fuse results according to commonly held or enforced relevance, such techniques tend to result in a more accurate methodology for crowd source solutions and market research analysis as compared to current techniques.

Example Methods Implementing the Disclosed Technology

Figure 27:
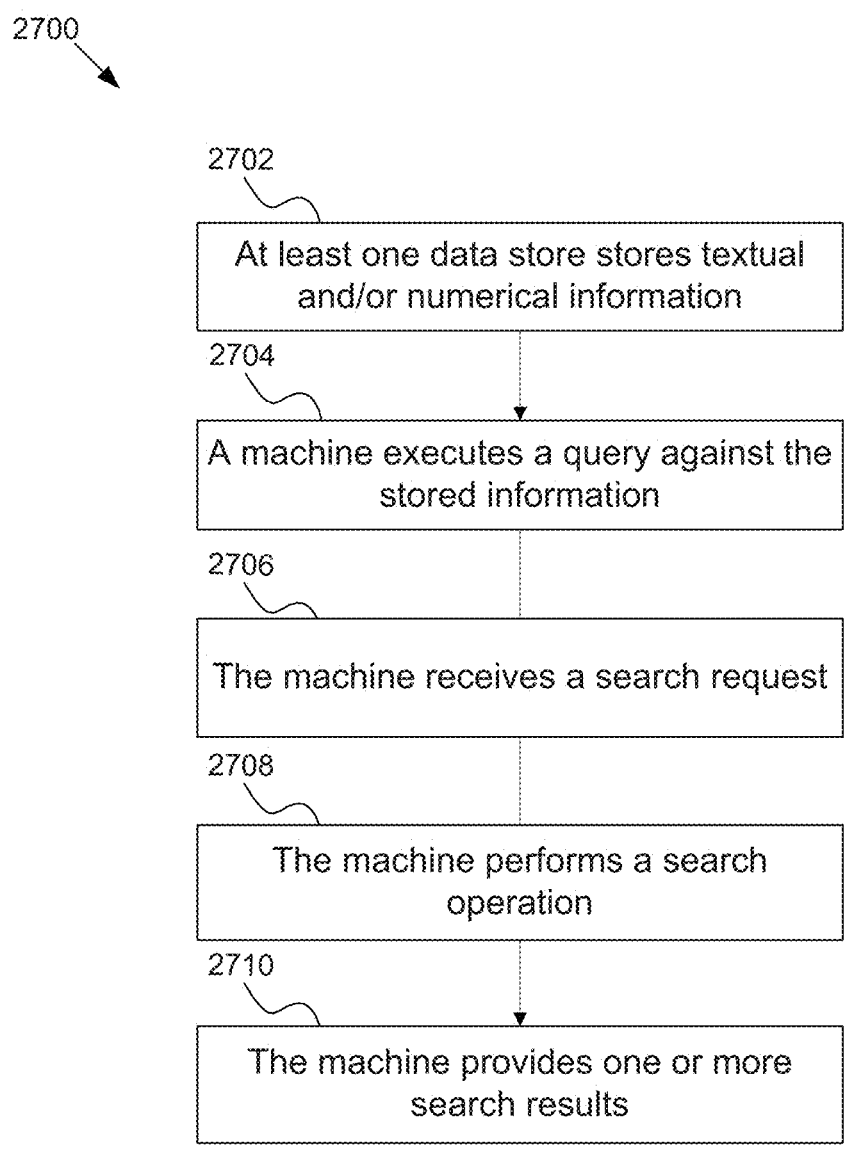
FIG. 27 is a flowchart illustrating a first example of a machine-controlled method in accordance with certain embodiments of the disclosed technology.

FIG. 27 is a flowchart illustrating a first example of a machine-controlled method 2700 in accordance with certain embodiments of the disclosed technology. At 2702, at least one data store stores information comprising textual information, numerical information, belief information, estimates, or any combination thereof. The at least one data store may include a structured database, an indexed data store, or both.

In certain embodiments, the stored information may include belief data that includes at least one representation of a statement corresponding to a user, the representation having associated therewith a belief certainty. The belief certainty may be provided by a user via a user interface or by an automated process such as automatic tagging, for example. The belief certainty may be based on at least one other representation of a statement corresponding to another user.

Alternatively or in addition thereto, the stored information may include estimation data that includes at least one characteristic having units associated therewith, the characteristic having associated therewith an estimation certainty. The estimation certainty may be provided by a user via a user interface or by an automated process such as automatic tagging, for example. The estimation certainty may be based on at least one other representation of a statement corresponding to a user. The estimation certainty may be further based on at least one other representation of a statement corresponding to another user.

At 2704, a machine executes a query against the information stored by the data store(s). The query may incorporate virtually any of the pertinent techniques described above. A detailed example of such a query is presented below with regard to FIG. 32 and the corresponding description thereof.

At 2706, a search request is received. The search request may be provided by a user using a user interface (UI), for example. Alternatively, the search request may be received from a third party or the request may be automatically generated by the system.

Responsive to the search request received at 2706, the machine performs a search operation as indicated at 2708. The search operation performed at 2708 may incorporate at least one result of the querying performed at 2704. Performing the search operation may include a determination as to whether any of the stored information meets a user-specified preference condition that indicates a user's preference for a first aspect of the stored information over at least a second aspect of the stored information. The user-specified preference condition may indicate a first level of preference of the user for the first aspect of the stored information and a second level of preference of the user for the second aspect of the stored information.

Alternatively or in addition thereto, performing the search operation at 2708 may include determining whether any of the stored information meets one or more user-defined importance conditions that each indicate whether a certain aspect of the stored information meets or exceeds a corresponding level of importance to the user.

Alternatively or in addition thereto, performing the search operation at 2708 may include determining whether any of the stored information meets a user-established target condition that indicates a target for a certain aspect of the stored information and a threshold range corresponding to said target. For example, the target may include a specific numerical value for a certain characteristic and the threshold range may include two additional values: one higher than the target and one lower than the target. In these embodiments, at least one search result may have a value that is within the range and may even be equal or substantially equal to the target itself.

At 2710, the machine provides at least one search result based on the search operation performed at 2708. In certain embodiments, the one or more search results are based on at least one subset of the stored information that corresponds to multiple users. The result(s) may be presented visually to a user via a graphic user interface (GUI) and a display device, for example. Alternatively or in addition thereto, the result(s) may be presented to the user by way of an audio device. The user may perform any of a number of subsequent actions with regard to the result(s) provided at 2710, such as the filtering, CDM, matching, and actionable intelligence operations described herein, for example.

Figure 28:
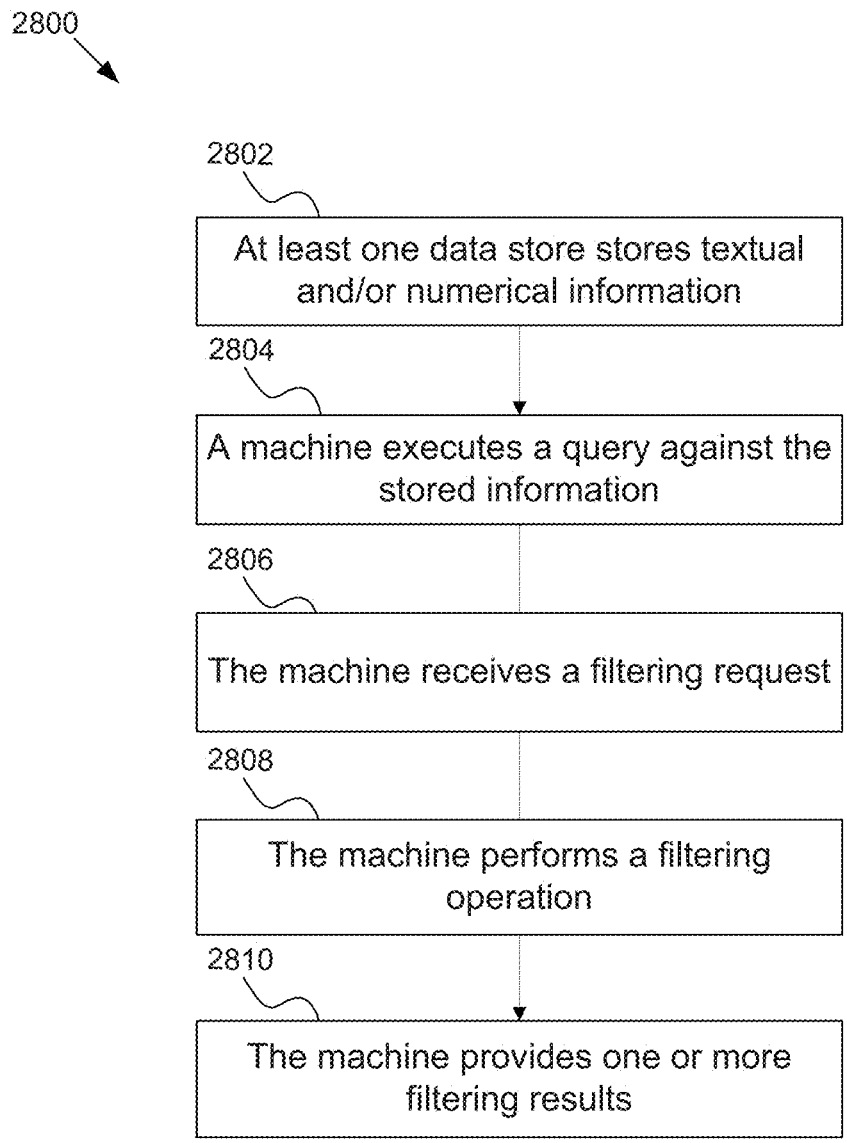
FIG. 28 is a flowchart illustrating a second example of a machine-controlled method in accordance with certain embodiments of the disclosed technology.

FIG. 28 is a flowchart illustrating a second example of a machine-controlled method 2800 in accordance with certain embodiments of the disclosed technology. At 2802, at least one data store stores information comprising textual information, numerical information, belief information, estimates, or any combination thereof. At 2804, a machine executes a query against the information stored by the data store(s). These initial operations are similar to the initial operations 2702 and 2704, respectively, of the method 2700 of FIG. 27.

At 2806, a filtering request is received. The filtering request may be provided by a user using a UI, for example. Alternatively, the filtering request may be received from a third party or the request may be automatically generated by the system.

Responsive to the filtering request received at 2806, the machine performs a filtering operation as indicated at 2808. The filtering operation performed at 2808 may incorporate at least one result of the querying performed at 2804. Performing the filtering operation may include a determination as to whether any of the stored information meets a user-specified preference condition that indicates a user's preference for a first aspect of the stored information over at least a second aspect of the stored information. The user-specified preference condition may indicate a first level of preference of the user for the first aspect of the stored information and a second level of preference of the user for the second aspect of the stored information.

Alternatively or in addition thereto, performing the filtering operation at 2808 may include determining whether any of the stored information meets one or more user-defined importance conditions that each indicate whether a certain aspect of the stored information meets or exceeds a corresponding level of importance to the user. In certain embodiments, at least one user-defined importance condition corresponds to a key word such as a topic, a subject, an email address, a website, a blog, a person, an entity, and a location, for example.

Alternatively or in addition thereto, performing the filtering operation at 2808 may include determining whether any of the stored information meets a user-established target condition that indicates a target for a certain aspect of the stored information and a threshold range corresponding to said target. For example, the target may include a specific numerical value for a certain characteristic and the threshold range may include two additional values: one higher than the target and one lower than the target. In these embodiments, at least one search result may have a value that is within the range and may even be equal or substantially equal to the target itself.

At 2810, the machine provides at least one filtering result based on the filtering operation performed at 2808. In certain embodiments, the one or more filtering results are based on at least one subset of the stored information that corresponds to multiple users. The result(s) may be presented visually to a user via a GUI and a display device, for example. Alternatively or in addition thereto, the result(s) may be presented to the user by way of an audio device. The user may perform any of a number of subsequent actions with regard to the result(s) provided at 2810, such as the search, CDM, matching, and actionable intelligence operations described herein, for example.

Figure 29:
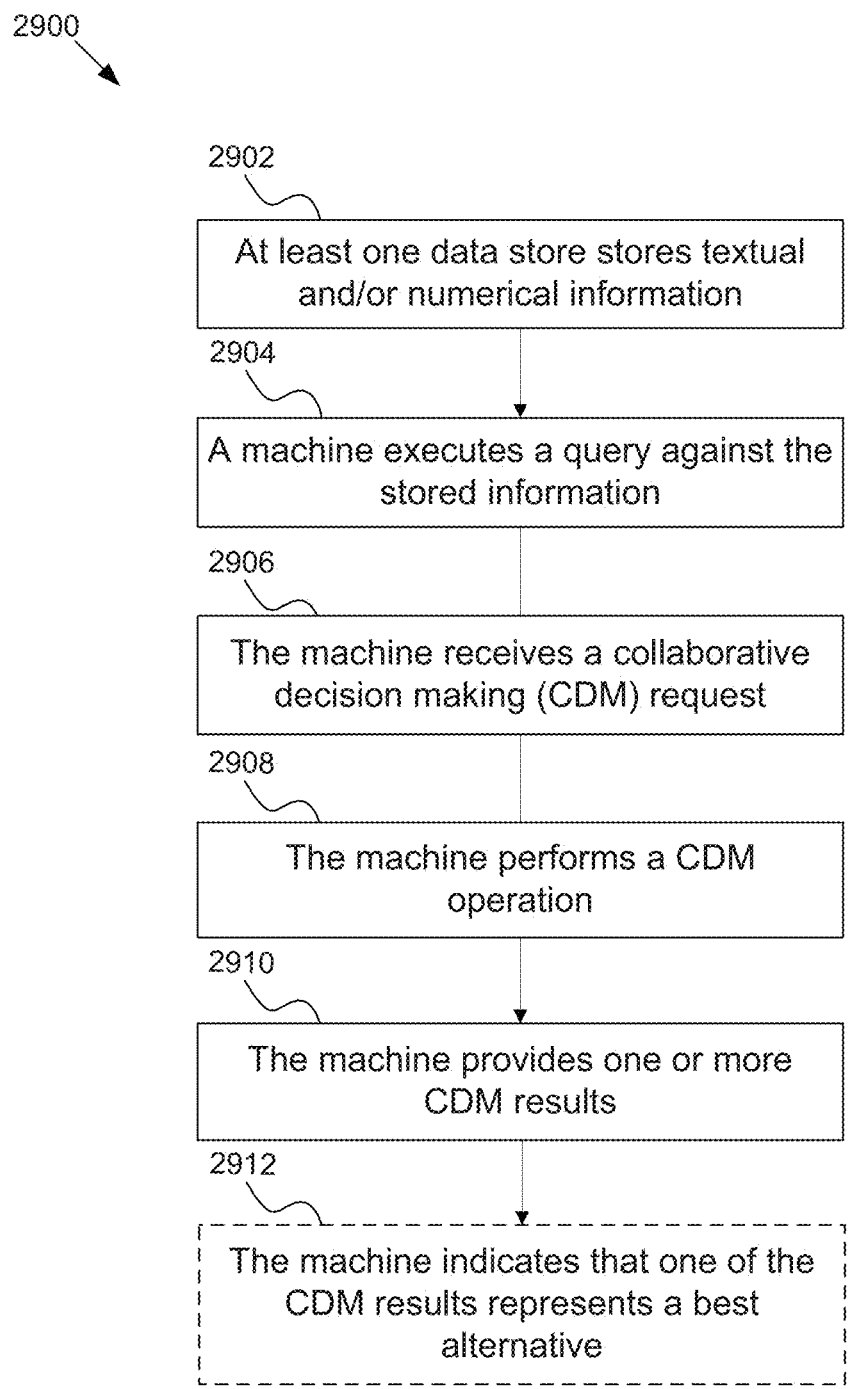
FIG. 29 is a flowchart illustrating a third example of a machine-controlled method in accordance with certain embodiments of the disclosed technology.

FIG. 29 is a flowchart illustrating a third example of a machine-controlled method 2900 in accordance with certain embodiments of the disclosed technology. At 2902, at least one data store stores information comprising textual information, numerical information, belief information, estimates, or any combination thereof. At 2904, a machine executes a query against the information stored by the data store(s). These initial operations are similar to the initial operations 2702 and 2704, respectively, of the method 2700 of FIG. 27.

At 2906, a collaborative decision making (CDM) request is received. The CDM request may be provided by a user using a UI, for example. Alternatively, the CDM request may be received from a third party or the request may be automatically generated by the system. Responsive to the CDM request received at 2906, the machine performs at least one CDM operation as indicated at 2908. The CDM operation(s) performed at 2908 may incorporate at least one result of the querying performed at 2904.

At 2910, the machine provides at least one CDM result based on the CDM operation performed at 2908. The result(s) may be presented visually to a user via a GUI and a display device, for example. Alternatively or in addition thereto, the result(s) may be presented to the user by way of an audio device. The CDM result may include a hiring decision, a procurement decision, a supply chain management (SCM) decision, a customer relationship management (CRM) decision, a business intelligence (BI) decision, and a product lifecycle management (PLM) decision, or any combination thereof. In situations where there are multiple CDM results, the machine may further provide an indication that a certain one of the CDM results represents a best alternative, as indicated by the optional operation at 2912.

The user may perform any of a number of subsequent actions with regard to the result(s) provided at 2910, such as the search, filtering, matching, and actionable intelligence operations described herein, for example.

Figure 30:
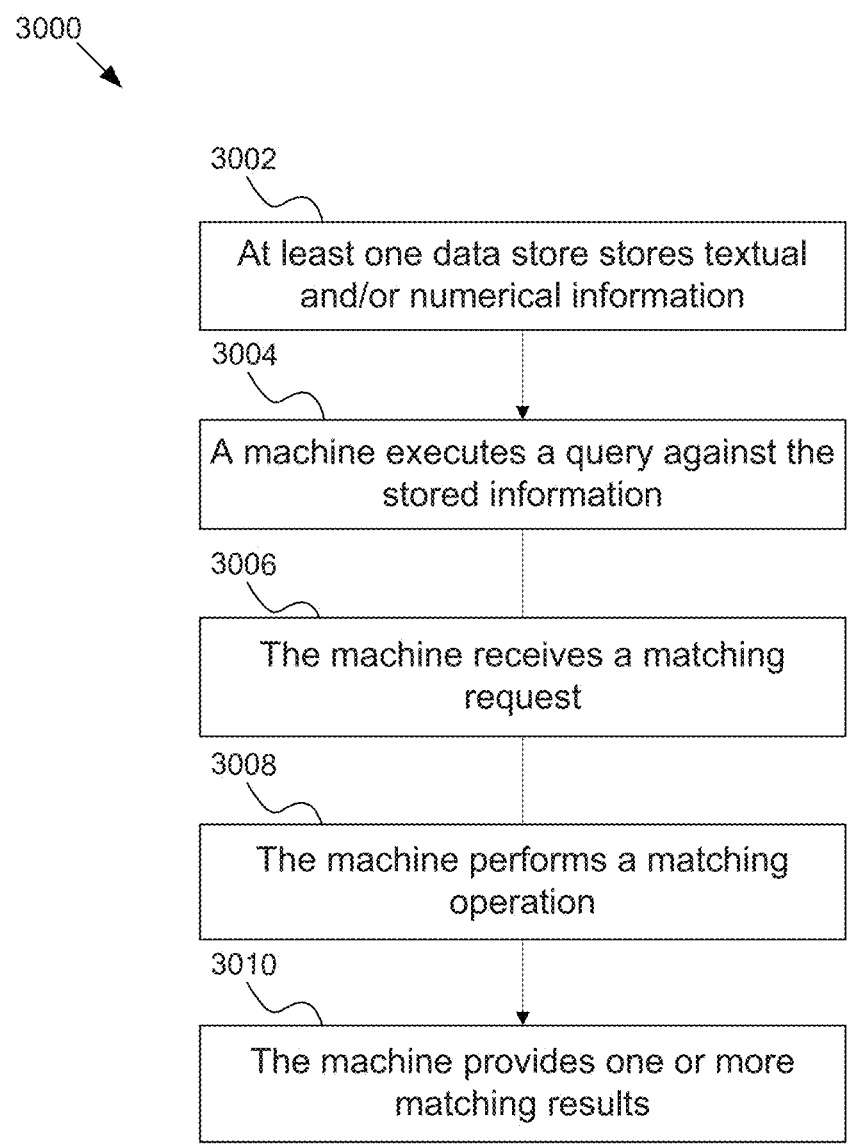
FIG. 30 is a flowchart illustrating a fourth example of a machine-controlled method in accordance with certain embodiments of the disclosed technology.

FIG. 30 is a flowchart illustrating a fourth example of a machine-controlled method 3000 in accordance with certain embodiments of the disclosed technology. At 3002, at least one data store stores information comprising textual information, numerical information, belief information, estimates, or any combination thereof. At 3004, a machine executes a query against the information stored by the data store(s). These initial operations are similar to the initial operations 2702 and 2704, respectively, of the method 2700 of FIG. 27.

At 3006, a matching request is received. The matching request may be provided by a user using a UI, for example. Alternatively, the matching request may be received from a third party or the request may be automatically generated by the system.

Responsive to the matching request received at 3006, the machine performs a matching operation as indicated at 3008. The matching operation performed at 3008 may incorporate at least one result of the querying performed at 3004. Performing the matching operation may include a determination as to whether any of the stored information meets a user-specified preference condition that indicates a user's preference for a first aspect of the stored information over at least a second aspect of the stored information. The user-specified preference condition may indicate a first level of preference of the user for the first aspect of the stored information and a second level of preference of the user for the second aspect of the stored information.

Alternatively or in addition thereto, performing the matching operation at 3008 may include determining whether any of the stored information meets one or more user-defined importance conditions that each indicate whether a certain aspect of the stored information meets or exceeds a corresponding level of importance to the user.

Alternatively or in addition thereto, performing the matching operation at 3008 may include determining whether any of the stored information meets a user-established target condition that indicates a target for a certain aspect of the stored information and a threshold range corresponding to said target. For example, the target may include a specific numerical value for a certain characteristic and the threshold range may include two additional values:

one higher than the target and one lower than the target. In these embodiments, at least one search result may have a value that is within the range and may even be equal or substantially equal to the target itself.

At 3010, the machine provides at least one matching result based on the matching operation performed at 3008. In certain embodiments, the one or more matching results are based on at least one subset of the stored information that corresponds to multiple users. The result(s) may be presented visually to a user via a GUI and a display device, for example. Alternatively or in addition thereto, the result(s) may be presented to the user by way of an audio device. The user may perform any of a number of subsequent actions with regard to the result(s) provided at 3010, such as the search, filtering, CDM, and actionable intelligence operations described herein, for example.

Figure 31:
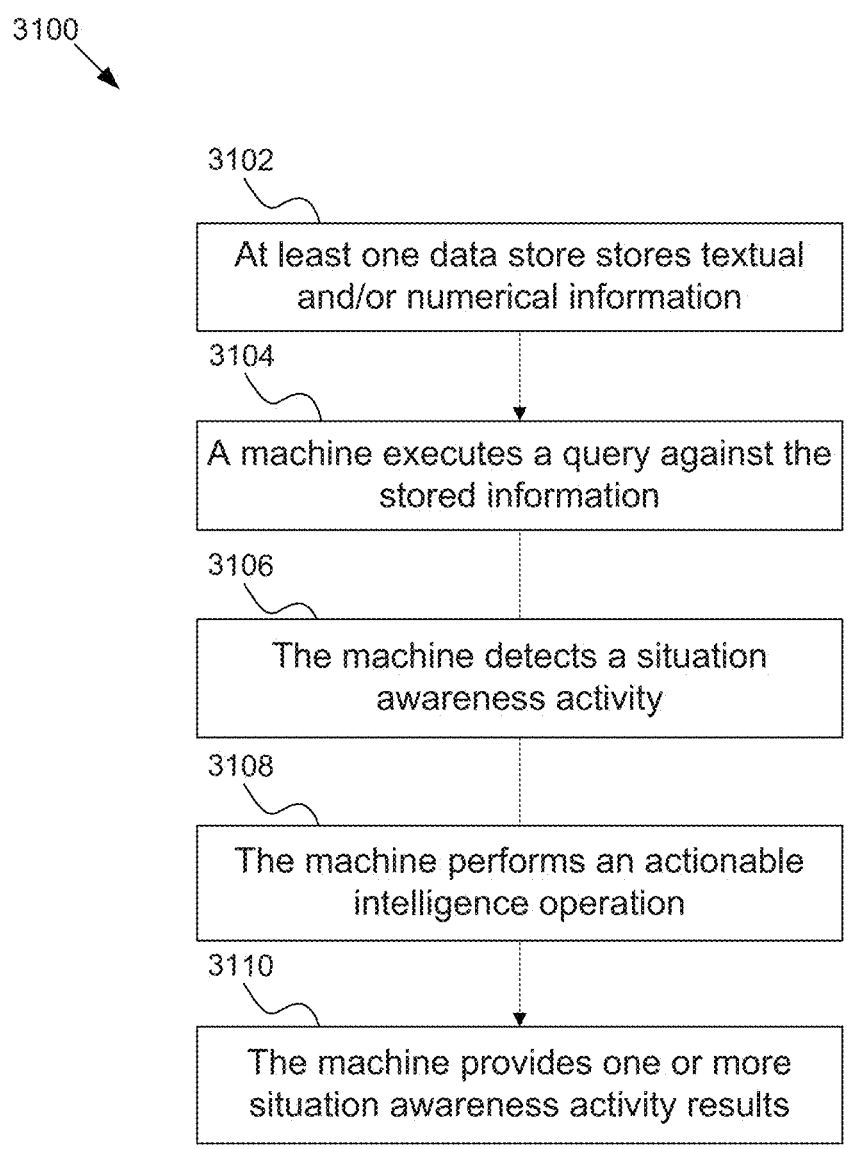
FIG. 31 is a flowchart illustrating a fifth example of a machine-controlled method in accordance with certain embodiments of the disclosed technology.

FIG. 31 is a flowchart illustrating a fifth example of a machine-controlled method 3100 in accordance with certain embodiments of the disclosed technology. At 3102, at least one data store stores information comprising textual information, numerical information, belief information, estimates, or any combination thereof. At 3104, a machine executes a query against the information stored by the data store(s). These initial operations are similar to the initial operations 2702 and 2704, respectively, of the method 2700 of FIG. 27.

At 3106, a situation awareness activity is detected. Responsive to detecting the situation awareness activity at 3106, the machine performs an actionable intelligence operation as indicated at 3108. The actionable intelligence operation performed at 3108 may incorporate at least one result of the querying performed at 3104. Performing the actionable intelligence operation may include a determination as to whether any of the stored information meets a user-specified preference condition that indicates a user's preference for a first aspect of the stored information over at least a second aspect of the stored information. The user-specified preference condition may indicate a first level of preference of the user for the first aspect of the stored information and a second level of preference of the user for the second aspect of the stored information.

Alternatively or in addition thereto, performing the actionable intelligence operation at 3108 may include determining whether any of the stored information meets one or more user-defined importance conditions that each indicate whether a certain aspect of the stored information meets or exceeds a corresponding level of importance to the user.

Alternatively or in addition thereto, performing the actionable intelligence operation at 3108 may include determining whether any of the stored information meets a user-established target condition that indicates a target for a certain aspect of the stored information and a threshold range corresponding to said target. For example, the target may include a specific numerical value for a certain characteristic and the threshold range may include two additional values: one higher than the target and one lower than the target. In these embodiments, at least one search result may have a value that is within the range and may even be equal or substantially equal to the target itself.

At 3110, the machine provides at least one situation awareness activity result based on the actionable intelligence operation performed at 3108. In certain embodiments, the one or more situation awareness activity results are based on at least one subset of the stored information that corresponds to multiple users. The result(s) may be presented visually to a user via a GUI and a display device, for example. Alternatively or in addition thereto, the result(s) may be presented to the user by way of an audio device. The user may perform any of a number of subsequent actions with regard to the result(s) provided at 3110, such as the search, filtering, CDM, and matching operations described herein, for example.

Figure 32:
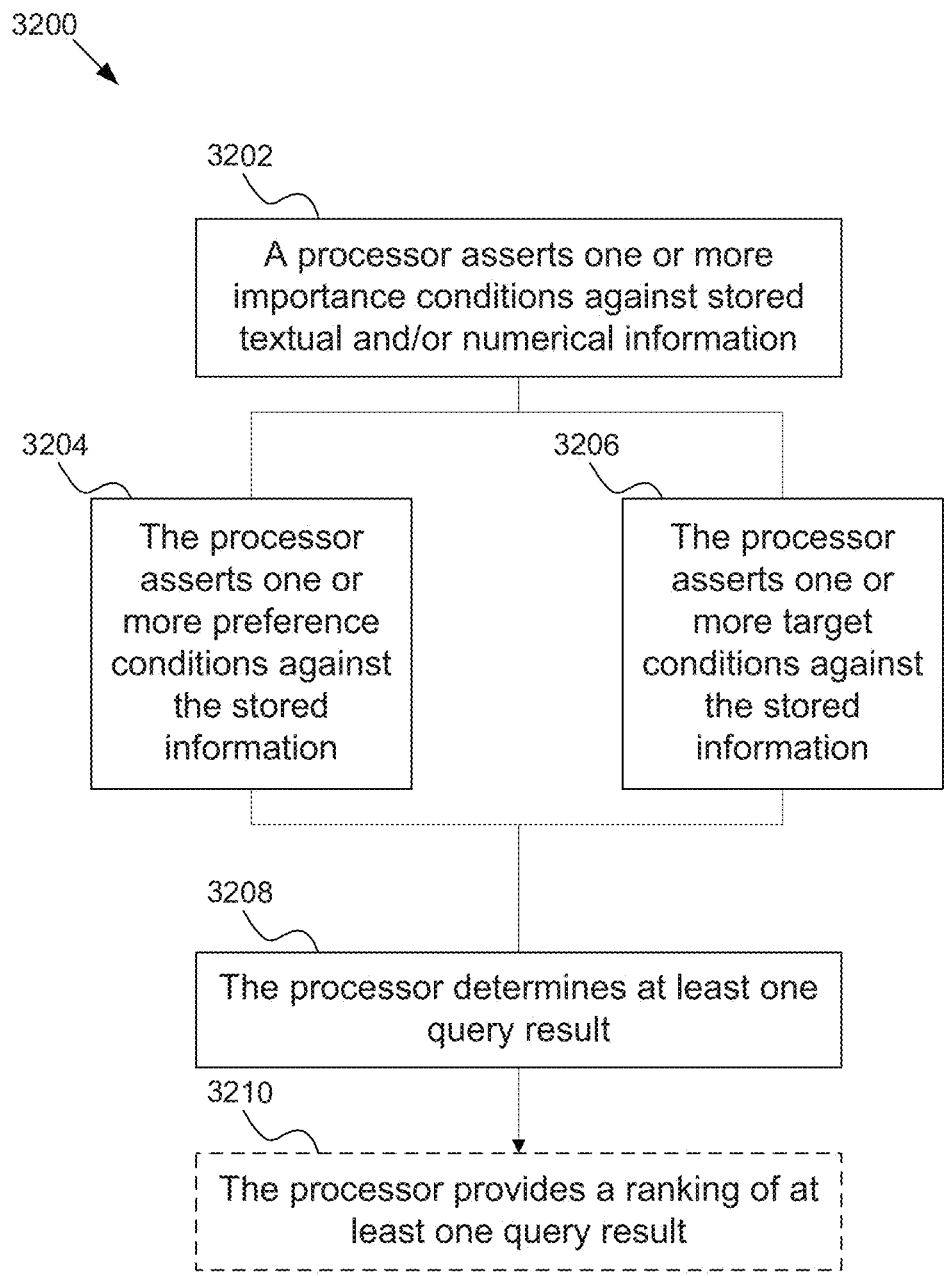
FIG. 32 is a flowchart illustrating a sixth example of a machine-controlled method in accordance with certain embodiments of the disclosed technology.

FIG. 32 is a flowchart illustrating a fifth example of a machine-controlled method 3200 in accordance with certain embodiments of the disclosed technology. The method 3200 is directed toward a processor executing a query against one or more data stores storing textual and/or numerical information.

At 3202, a processor applies an importance by asserting at least one user-defined importance condition against the stored information. The at least one importance condition may be provided by a user via a user interface. Each user-defined importance condition may correspond to at least one user-specified preference condition, at least one user-established target condition, both of which are described below, or both.

In addition to applying the importance at 3202, the process further performs either or both of the operations at 3204 and 3206 as described below before advancing to 3208. However, the operations at 3202 and 3204 and/or 3206 may be performed by the processor at least partially concurrently with one another or in a fully sequential manner.

At 3204, the processor applies a preference probability by asserting at least one user-specified preference condition against the stored information. Certain embodiments may include multiple preference conditions that each has a corresponding preference satisfaction value that is no less than 0.0 and no more than 1.0, for example. In situations where there are multiple preference conditions, they may be ranked according to the corresponding preference satisfaction values. The at least one user-specified preference condition may be provided by a user via the user interface.

At 3206, the processor asserts at least one user-established target condition against the stored information. Certain embodiments may include multiple target conditions that each has a corresponding target satisfaction value that is no less than 0.0 and no more than 1.0, for example. In situations where there are multiple target conditions, they may be ranked according to the corresponding target satisfaction values. The at least one user-established target condition may be provided by a user via the user interface. In certain embodiments, the target condition may include a user-provided target value for a first aspect of the stored information and a user-provided threshold range corresponding to the target value.

At 3208, one or more query results are determined. In situations where there are more than one query result at 3208, an optional ranking operation may be performed as indicated at 3210. For example, the machine may provide an indication of a ranking that corresponds to at least one of the results. The ranking may be based on one or more of the user-defined importance conditions, one or more of the user-specified preference conditions, one or more of the user-established target conditions, or any combination thereof.

Examples of Implementations Pertaining to E-Commerce

Figure 33:
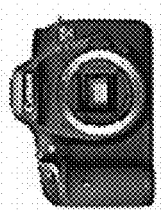
FIG. 33 illustrates an example of a prior e-commerce user interface 3300.

FIG. 33 illustrates an example of a prior e-commerce user interface 3300. In the example, a user is searching for a particular digital SLR camera. The interface 3300 allows a user to select a price range, specify what kind of optical zoom he or she is interested in, and indicate the desired megapixel level. However, such searching may yield too many hits or no useful hits and, in either scenario, the search engine will likely miss the particular camera that would best suit the user.

Figure 34:
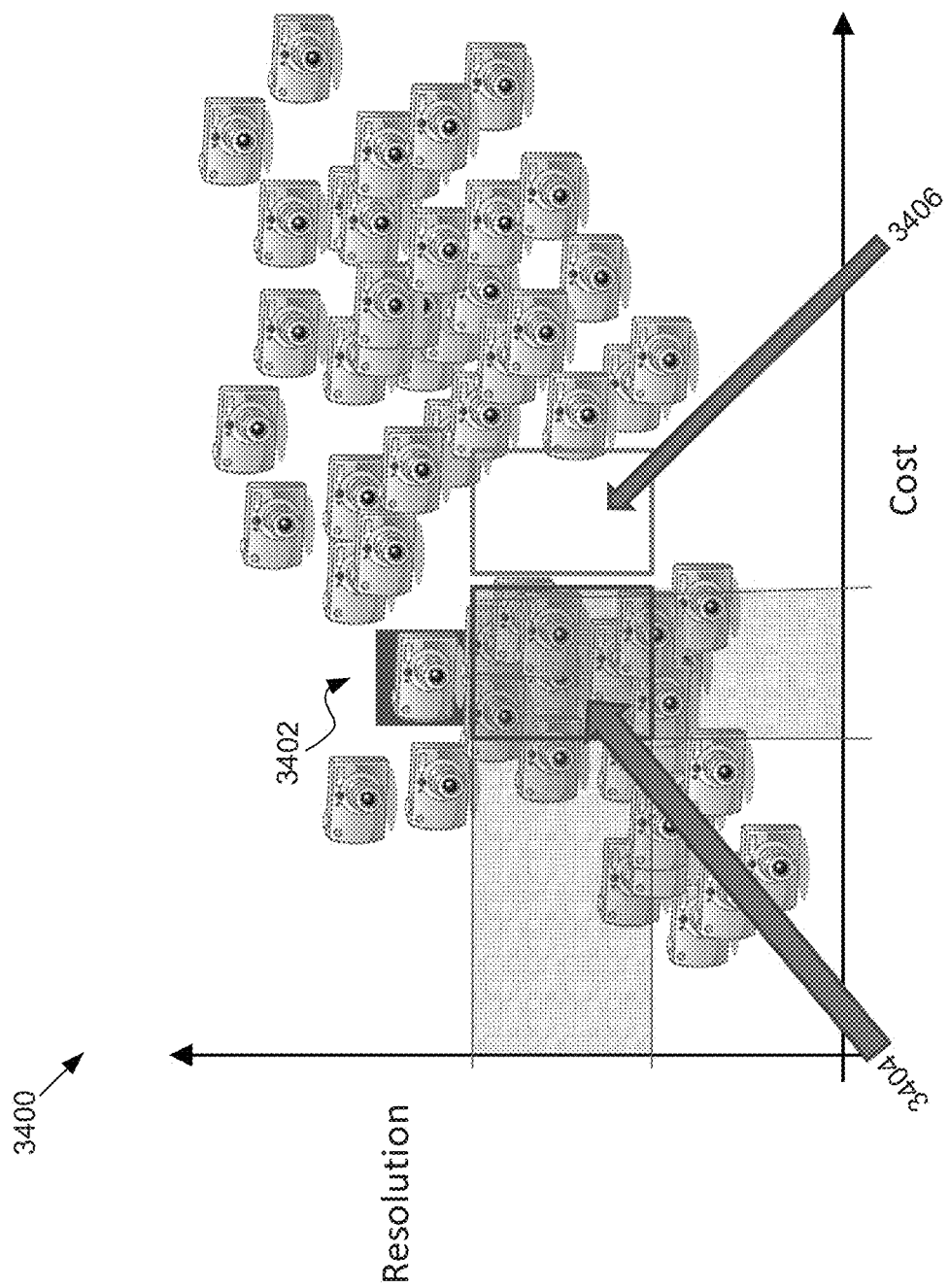
FIG. 34 illustrates a graphical representation of a two-dimensional mapping of potential search results available to a user interface such as the interface of FIG. 33.

FIG. 34 illustrates a graphical representation of a two-dimensional mapping 3400 of potential search results available to a user interface such as the interface 3300 of FIG. 33. Each of the items in the mapping 3400 is positioned based on resolution, e.g., megapixels, and cost. As noted above, prior e-commerce user interfaces, including the underlying searching techniques, generally provide too many results or two few useful results. In the example, a certain camera 3402 is best suited to the user's desires. However, a first set of search results 3404 from a first user-initiated search provides a potentially overwhelming number of results to the user, which may lead to frustration and confusion. A second set of search results 3406 provides few, if any, meaningful results. In both cases, the system fails to provide the user with the optimal camera 3402.

Figure 35:
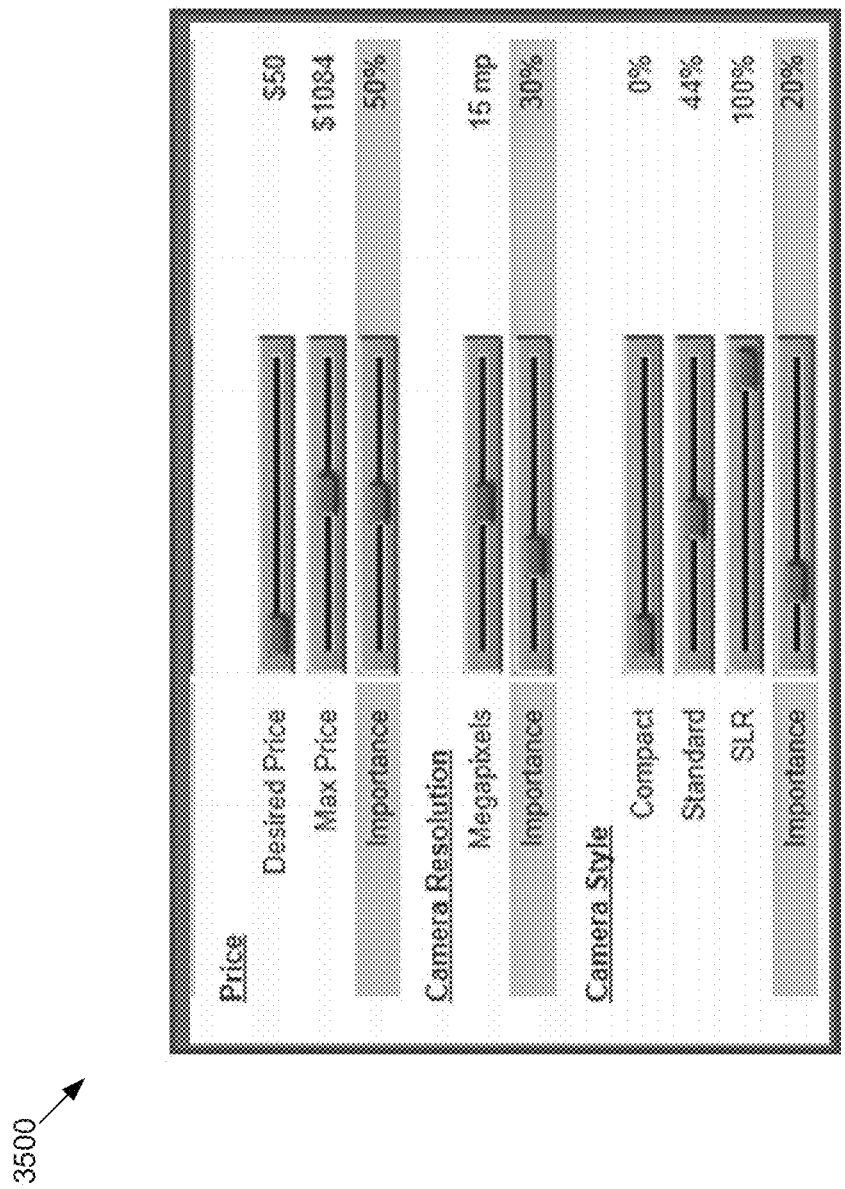
FIG. 35 illustrates an example of an e-commerce user interface in accordance with certain embodiments of the disclosed technology.

FIG. 35 illustrates an example of an e-commerce user interface 3500 in accordance with certain embodiments of the disclosed technology. In the example, a user may enter a desired price and a maximum price as elements of a query target, and an importance, i.e., a numeric representation of how important price is to the user vis a vis other characteristics such as resolution and style, for example. The user may also enter a desired megapixel resolution and an importance pertaining to the desired resolution. The user may also indicate multiple preferences pertaining to camera style, e.g., compact, standard, and SLR. As with price and resolution, the user may provide an importance pertaining to the style. The user interface 3500 may rely on underlying searching tools and techniques as described above to generate a list of results to be presented to the user.

FIG. 36 illustrates an example of a set of search results 3600 stemming from use of the user interface 3500 of FIG. 35 in accordance with certain embodiments of the disclosed technology. In the example, the search results 3600 include three different cameras that each have a rating indicating how close the corresponding camera matches the user's targets and preferences, particularly in view of the associated importance values provided by the user. In the example, the search results 3600 also include certain characteristics pertaining to each of the cameras in the listing. Such information may be modified by the user, automatically by the system, or both.

It should be noted that, while the illustrated example focuses on a certain type of product, i.e., a camera, and the associated user interface, i.e., the interface 3500 of FIG. 35, allows the user to provide two target values (price and resolution), three preference values corresponding to three different camera styles, and associated importance values, any of a number of user interfaces may be implemented in connection with the tools and techniques described herein. Indeed, a user interface in accordance with the disclosed technology may be provided for virtually any type of e-commerce activity, with particular regard to e-retail sites, and such an interface may allow a user to specify virtually any targets, preferences, importance values, or combination thereof.

Examples of Implementations Pertaining to Employment-Related Applications

Figure 37:
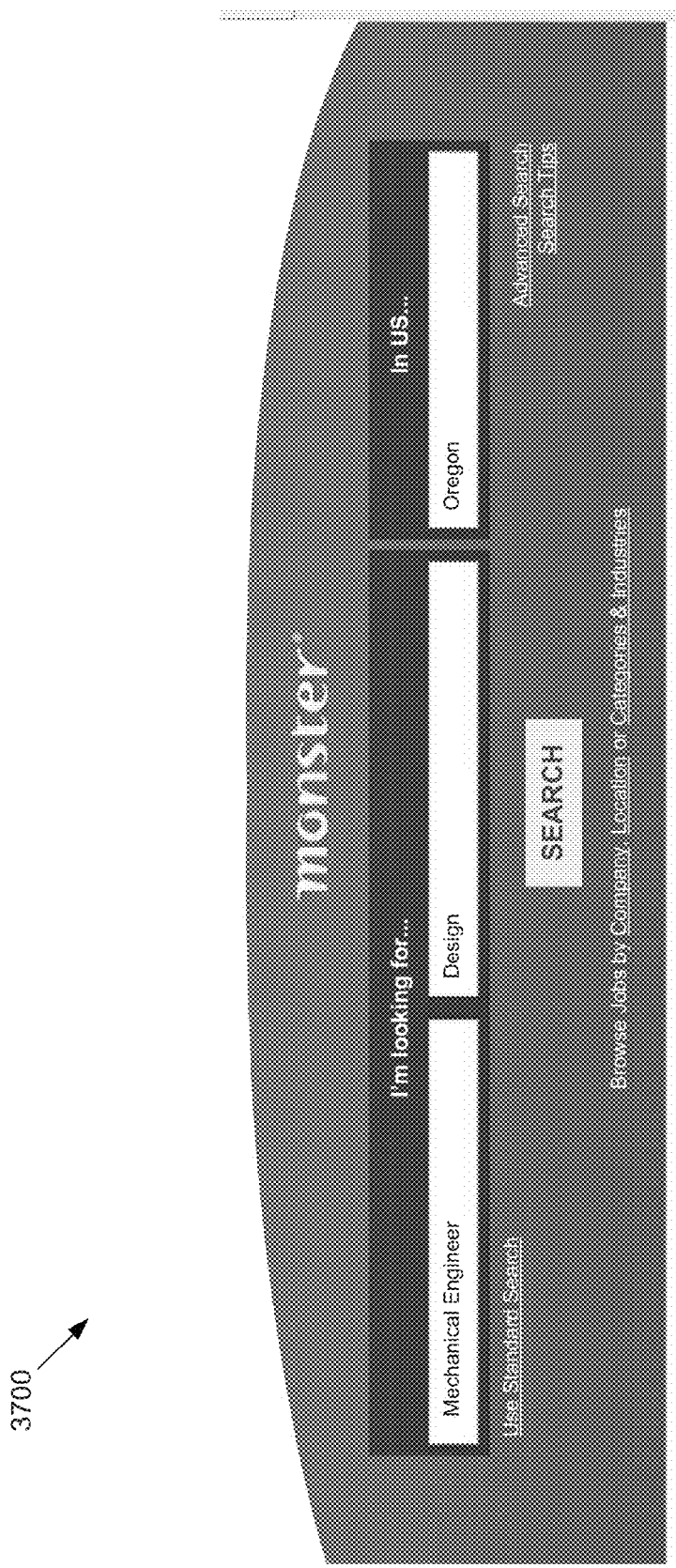
FIG. 37 illustrates an example of a prior job search user interface.

FIG. 37 illustrates an example of a prior job search user interface 3700. The interface 3700 allows a job-seeker to enter a textual description of what he or she seeks in terms of a job along with an indication of his or her preferred geographic location. In the example, the user has entered "mechanical engineer" and "design" as search terms with respect to job description and "Oregon" in terms of desired location. Such a broad search may yield pages of search results, many of which may very well be of little, if any, interest to the user.

Figure 38:
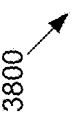
FIG. 38 illustrates another example of a prior job search user interface.

FIG. 38 illustrates another example of a prior job search user interface 3800. This interface 3800 may be presented as a second-stage interface subsequent to the user initiating a search using the interface 3700 of FIG. 37, for example. Consider an example in which a user uses the interface 3700 of FIG. 37 to search for a "technician" job in "Oregon." The interface 3800 of FIG. 38 may be presented to the user to allow the user to refine the search by checking/unchecking various checkboxes and selecting certain items from dropdown menus.

However, the prior interface 3800 is very "black-and-white" because checking a certain checkbox essentially indicates that the user really desires the corresponding characteristic and not checking a certain checkbox essentially indicates that the user has no desire in the corresponding characteristic. There are various other shortcomings associated with an interface such as the interface 3800 of FIG. 38. For example, should the user select a certain salary or salary range from a dropdown box, the search results may exclude entries in which no salary information is listed. Also, it is typically time-consuming—and may even be difficult and/or confusing—for a user to unselect checkboxes once they've been selected.

Figure 39:
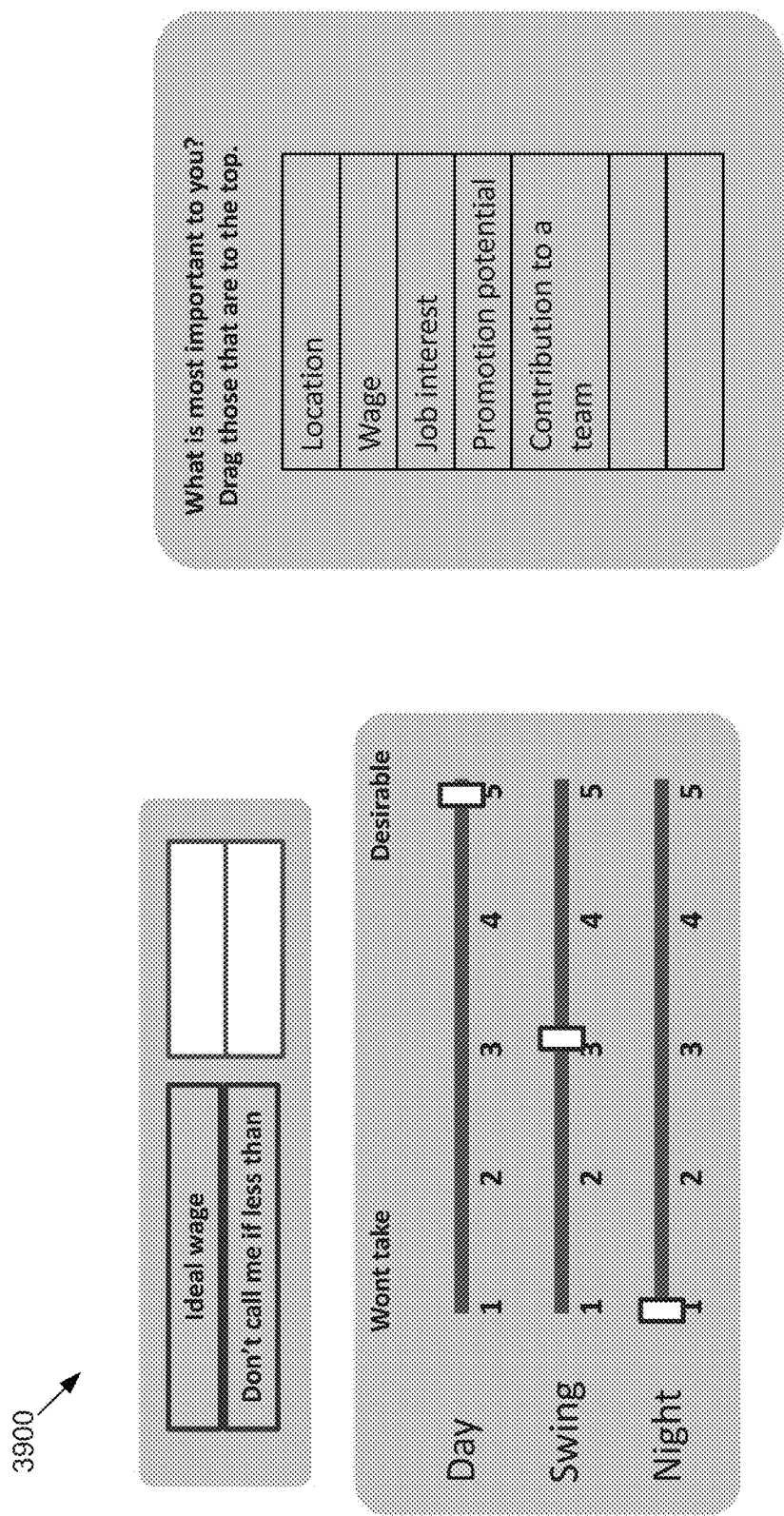
FIG. 39 illustrates a first example of a job seeker user interface in connection with certain job search-related implementations in accordance with the disclosed technology.

FIG. 39 illustrates a first example of a job seeker user interface 3900 in connection with certain job search-related implementations in accordance with the disclosed technology. The job seeker interface 3900 allows a user to enter various targets such as a desired wage and one-sided (or two-sided) range in connection with the desired wage. This example allows for positions providing a wage nearer the "Ideal wage" to be given more emphasis than those near the "Don't call" threshold. The user may also indicate a number of preferences such as what type of shift(s) the user is willing to pursue. This example indicates that positions offering "Day shift" are preferred over "Swing shift" which are preferred over "Night shift." The interface 3900 also allows the user to provide a number of characteristics that have some importance to him or her, such as geographic location, wage, job description, etc.

Figure 40:
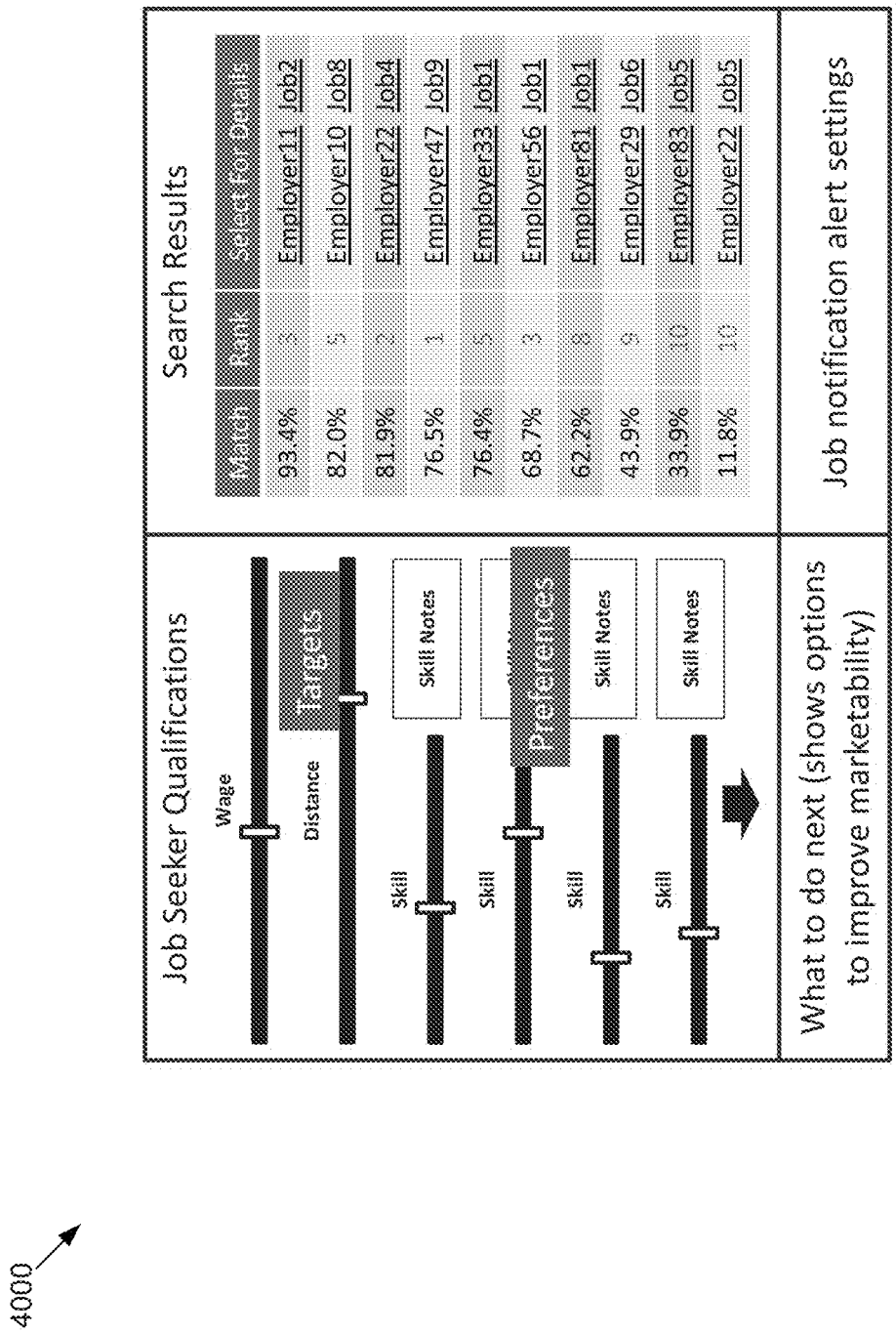
FIG. 40 illustrates a second example of a job seeker user interface in connection with certain job search-related implementations in accordance with the disclosed technology.

FIG. 40 illustrates a second example of a job seeker user interface 4000 in connection with certain job search-related implementations in accordance with the disclosed technology. The second job seeker interface 4000 may be a second interface that is presented to the user subsequent to and based on the user's interaction with a first user interface, such as the interface 3900 of FIG. 39, for example. The second interface 4000 presents a listing of search results that each have a match value associated therewith and, in the present example, are ranked in order of match value.

In the example, the user may specify (or revise) any of a number of characteristics that pertain to the search. For example, the user may provide (or adjust) certain targets, such as wage and geographic location. The user may also provide (or adjust) any of a number of preferences, such as a variety of different skills associated with desired job listings.

In the example, the interface 4000 allows the user to enter or adjust the targets and preferences by way of multiple sliding mechanisms. While such mechanisms are generally easy to use and even enjoyable by users, such information may be provided by any of a number of different mechanisms. For example, a text box may be provided for any or all of the targets and/or preferences such that the user may enter a numeric value rather than use a slider.

In the example, the user may also enter belief information or estimates, or a combination thereof, the representation having associated therewith a certainty which may be provided by the user via the user interface or by an automated process such as automatic tagging, for example.

The search results may change responsive to changes with respect to other aspects of the second interface 4000. Such changes in the search results may occur in real-time or after a certain action such as a "refresh" request by the user or after a certain specified period of time has passed.

Figure 41:
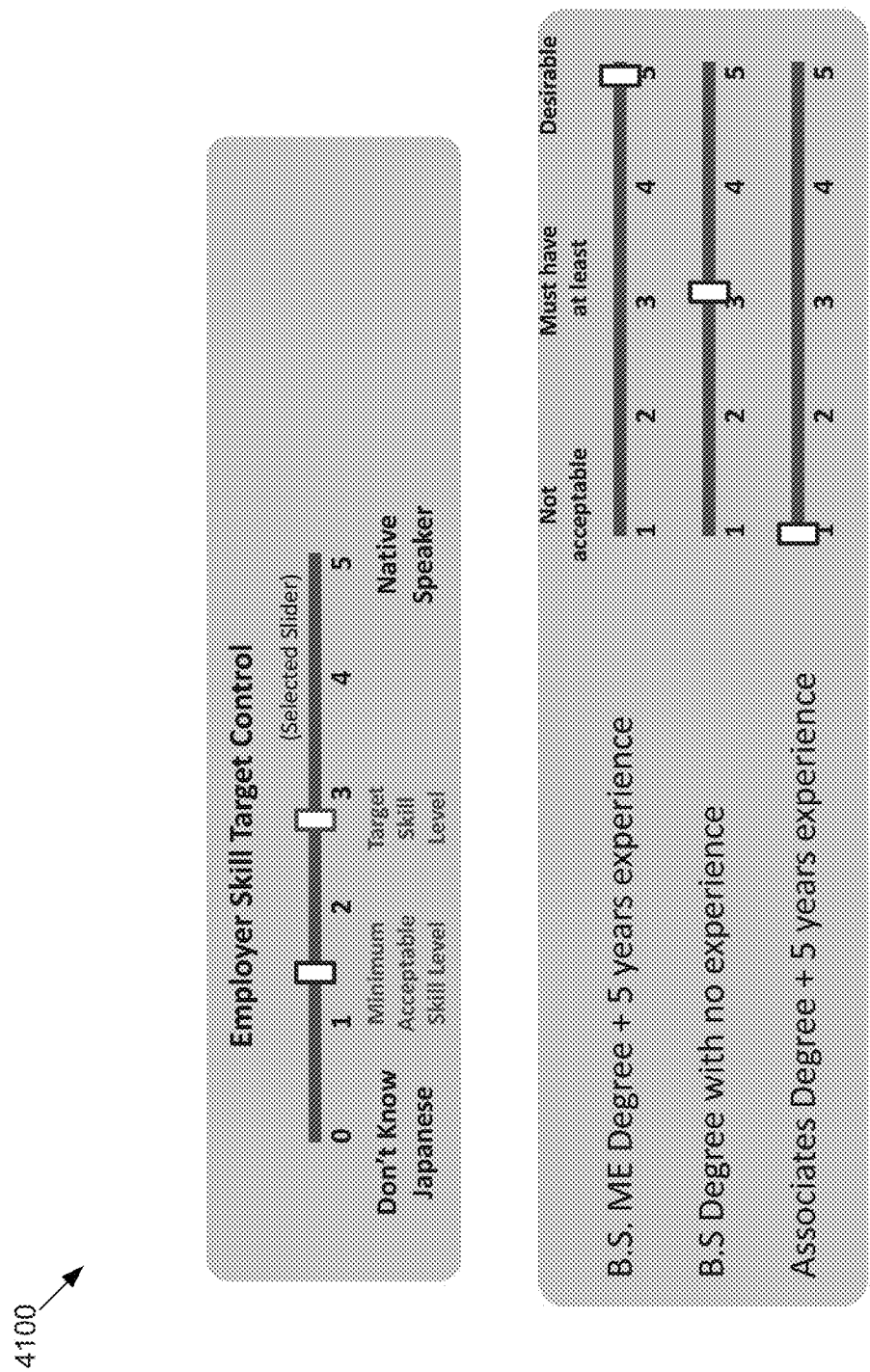
FIG. 41 illustrates a first example of an employer user interface in connection with certain job search-related implementations in accordance with the disclosed technology.

FIG. 41 illustrates a first example of an employer user interface 4100 in connection with certain job search-related implementations in accordance with the disclosed technology. The employer interface 4100 allows a user to enter a certain target value, such as a desired skill level, and one-sided (or two-sided) range in connection with the target value. The user may also indicate a number of preferences such as what types of degree(s) potential job seekers should have. In the example, the interface 4100 also allows the user to enter/adjust the targets and preferences that have some importance by way of slider mechanisms, though such information may be collected using any of a number of other suitable user input mechanisms.

Figure 42:
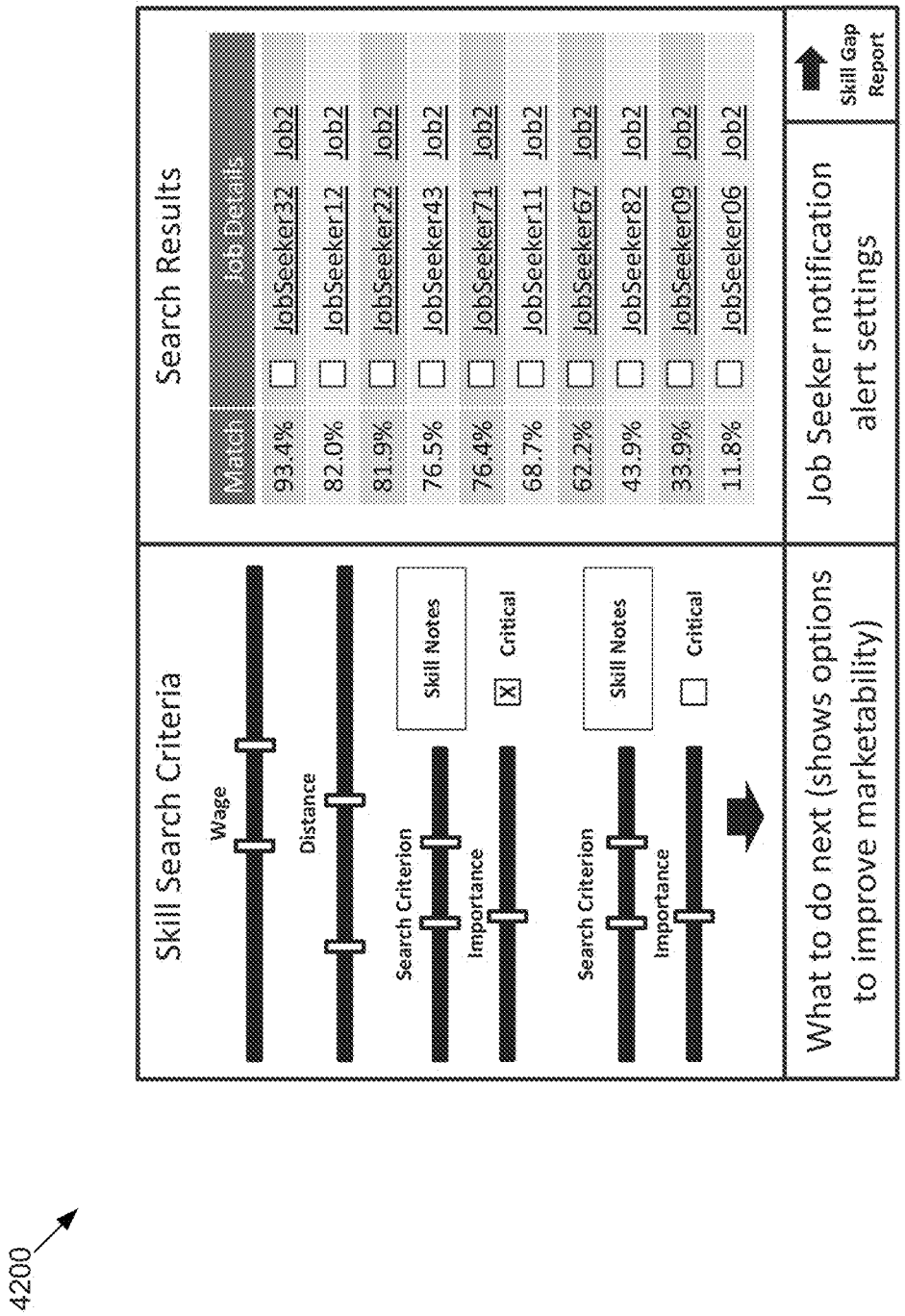
FIG. 42 illustrates a second example of an employer user interface in connection with certain job search-related implementations in accordance with the disclosed technology.

FIG. 42 illustrates a second example of an employer user interface 4200 in connection with certain job search-related implementations in accordance with the disclosed technology. The second employer interface 4200 may be a second interface that is presented to the user subsequent to and based on the user's interaction with a first user interface, such as the interface 4100 of FIG. 41, for example. The second interface 4200 presents a listing of search results that each have a match value associated therewith and, in the present example, are ranked in order of match value.

In the example, the user may specify (or revise) any of a number of characteristics that pertain to the search by providing or adjusting targets, preferences, or both. In the example, the interface 4200 allows the user to enter or adjust the targets and preference by way of multiple sliding mechanisms. As with the interface 4000 of FIG. 40, described above, other user interaction mechanisms, e.g., text boxes, may be implemented in place of or in addition to the slider mechanisms.

In the example, the user may also enter belief information or estimates, or a combination thereof, the representation having associated therewith a certainty which may be provided by the user via the user interface or by an automated process such as automatic tagging, for example.

The search results may change responsive to changes with respect to other aspects of the second interface 4200, either in real-time or after a certain action such as a "refresh" request by the user or after a certain specified period of time has passed.

Implementations Pertaining to Social Networking Applications and Websites

Figure 43:
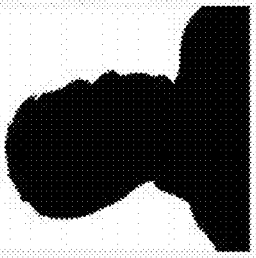
FIG. 43 illustrates an example of a social networking user interface implemented in connection with certain embodiments of the disclosed technology.

There are a number of different industries and fields in addition to employment searches that may take advantage of the tools and techniques described herein, such as social networking, for example. FIG. 43 illustrates an example of a social networking user interface 4300 implemented in connection with certain embodiments of the disclosed technology. It should be noted that some or all of the aspects of the social networking user interface 4300 may be implemented in connection with existing social networking applications/platforms or separately therefrom.

Consider an example in which a user of a social networking site wants to connect with other users based on any of a number of preferences. In the example, the user may specify whether he or she is merely looking for new people, looking for friends, or something in between. The user may also specify whether he or she is more interested in someone to have fun with or someone to work with. Alternatively or in addition thereto, the user may indicate how important geographic location of the other user(s) is to him or her. A search may be performed using any of a number of implementations as described herein and a listing of results may be presented to the user. Each of the search results presented to the user may have a match value associated therewith and, in certain embodiments, the results may be ranked in accordance with the match values.

In the example, the user may also include belief information or estimates, or a combination thereof, the representation having associated therewith a certainty which may be provided by the user via the user interface or by an automated process such as automatic tagging, for example.

Examples of Filtering Mechanisms Suitable for Social Networking Implementations

Figure 44:
FIG. 44 illustrates an example of a current social stream interface.

FIG. 44 illustrates an example of a current social stream interface 4400. The interface 4400 includes a social stream portion 4402 that presents a number of items such as events, invitations, messages, discussions, etc. A content portion 4404 provides greater detail and information with regard to one or more selected items within the social stream portion 4402. Current systems such as use the present interface 4400, however, have insufficient filter capability to meet user demands and requirements.

Figure 45:
FIG. 45 illustrates a first example of a social stream filter interface in accordance with certain embodiments of the disclosed technology.

FIG. 45 illustrates a first example of a social stream filter interface 4500 in accordance with certain embodiments of the disclosed technology. The interface 4500 allows a user to drag key words from email messages, news feeds, etc. into different classes and topics within classes. In the example, the user has indicated at least three topics (movies, club, and sports) as having some level of importance to him or her. The user has also selected a number of senders (Betty, Bob, and Fred) as being a factor in the desired filtering. Unlike current filters, however, the disclosed technology takes into account preferences and/or targets in connection with indications of importance in accordance with the techniques described above to provide the user with a significantly improved filter experience.

In certain embodiments, a user may indicate that messages from his or her spouse are of greater importance than messages from other senders. The user may indicate that messages from his or her colleagues are of high importance and that messages from his or her boss' work email are of higher importance. The user may also indicate that messages received through his or her work email are of greater importance than from other incoming addresses and that messages with the user's email in the "To" field have a greater importance than messages in which his or her email address is in the "cc" or "bcc" field. The user may also indicate that messages with one or more of a specific set of keywords in the subject or body of the message are of high importance, and, therefore, when said messages are from a sender also indicated as of high importance the combined importance value of said messages is calculated as described above.

With regard to message threads, a user may apply a flag to take advantage of a number of options associated therewith. For example, a user may indicate that flagged messages or message threads are of higher importance than non-flagged messages or threads. The user may also indicate that messages or other items that are related to messages flagged by the user are of high importance.

With regard to news feeds, there are a number of items with which the user may indicate a certain level of importance. For example, the user may indicate that status feed items from friends or family members, e.g., spouse and/or kid(s), should be of higher importance than other items. The user may specify other users or events such that associated status feed items should have a higher importance. The user may indicate that certain items from certain sources, e.g., news sites, should have higher importance.

In certain embodiments, a user may indicate that items with comments from certain friends are of a certain importance and/or that items with more than one "like" are to have a certain importance. The user may further indicate that items having one or more "likes" from certain people, e.g., certain or all family and friends, should have associated therewith a particularly high importance. The user may also direct the system to assign a particular importance to items that the user (or other designated user) has tagged.

Figure 46:
FIG. 46 illustrates a second example of a social stream filter interface in accordance with certain embodiments of the disclosed technology.

FIG. 46 illustrates a second example of a social stream filter interface 4600 in accordance with certain embodiments of the disclosed technology. The interface 4600 allows a user to provide any of a number of preferences, targets, and indications of importance such that implementations of underlying search mechanisms as described herein may intelligently filter the user's social stream, e.g., messages, events, and content, in accordance with his or her desires. For example, the interface 4600 may allow the user to indicate a level of importance of each of contacts, news, sports, and hobbies to him or her.

The interface 4600 provides a number of other tools to be used by the user. For example, the user may reorder the entries under any or all of the headings in accordance with his or her preferences. In the example, the user has indicated a greater preference for news stories about Iran than President Obama. The user may also add specific information such as targets, e.g., dates or other numerical characteristics, to any or all of the individual keywords or entries under any of the headings. The user may also add items to individual topics or define new topics by dragging keywords or hashtags into one or more of the listings, for example.

By using interfaces such as the interfaces 4500 and 4600 of FIGS. 45 and 46, respectively, for example, a user may better control what information is included in news feeds and social tools such as Facebook and Twitter accounts. Such items may be presented to the user in an ordered list that optimally matches his or her preferences, targets, and indicated importance of such items for an improved experience. Presentation and ranking of these items may change automatically, e.g., in real-time, or pursuant to a user command or other designated action. In certain embodiments, these listings may be continually updated as information is received.

Regardless of the application, the techniques described above take into account certain features of the information that is being filtered by determining its certainty in terms of information belief and estimation. These characteristics of the data feed combined with the query in terms of preference, targets, and importance may provide superior filtering control.

Implementations Pertaining to Enterprise Architecture and Applications

Figure 47:
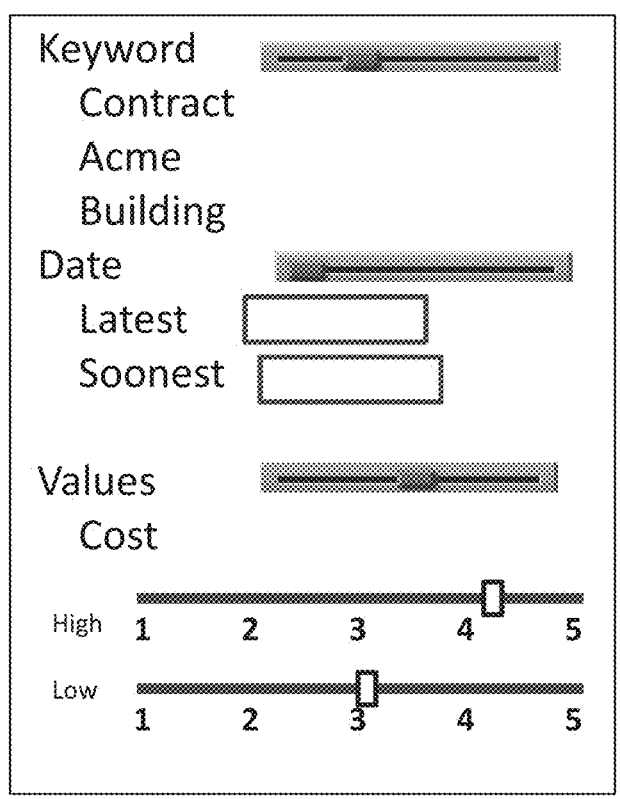
FIG. 47 illustrates an example of an enterprise user interface in accordance with certain embodiments of the disclosed technology.

FIG. 47 illustrates an example of an enterprise user interface 4700 in accordance with certain embodiments of the disclosed technology. A user may use the interface 4700 in connection with any of a number of different situations such as hiring decisions, procurement decisions, supply chain management (SCM) decisions, customer relationship management (CRM) decisions, business intelligence (BI) decisions, and product lifecycle management (PLM) decisions.

A user may use the interface 4700 to indicate any of a number of topics and an associated importance. In the example, the user has indicated the topics "Contract," "Acme," and "Building" as being preferences for enterprise searching. The user may reorder the listing of topics and easily remove topics therefrom and/or add topics thereto by dragging and dropping, for example. In the example, the interface 4700 provides a slider for the user to indicated the importance, i.e., a representation as to how important the specified topics are to the user vis a vis other characteristics such as dates and costs. While the interface 4700 uses slider mechanisms, it should be noted that any of a number of other suitable user interaction mechanisms, e.g., text boxes, may be used in place of or in addition to sliders.

The user may also use the interface 4700 to enter a target date and/or date range. In the example, the user is allowed to enter a "Latest" date and a "Soonest" date to indicate the desired date range. As with the listing of topics described above, a slider mechanism is provided to allow the user to indicate a specific importance with regard to the entered date range.

The illustrated interface 4700 also allows a user to enter various types of value- and cost-related characteristics to capture target information. While the example includes multiple sliding mechanisms for a user to indicate such characteristics, any other suitable user interaction mechanisms, e.g., drag and drop, may be implemented in place of or in addition to the sliding mechanisms. The user may also indicate a measure of importance of such information to the user by way of a sliding mechanism or other suitable technique.

Users may add specific details to certain items such as dates, costs, and other measured topics for targets. As with the listing of topics discussed above, topics here may be modified in a similar manner. For example, topics may be added, deleted, and/or reordered. These operations may be performed by the user dragging keywords or hashtags from elsewhere, e.g., an email message, onto the listing. Systems implementing interfaces such as the interface 4700 of FIG. 47 readily allow a user or group to control what information sources in the enterprise are included.

The user interface 4700 may rely on underlying searching tools and techniques as described above to generate a list of results to be presented to the user. The results may be advantageously presented in an ordered list that best matches the user's or group's preferences, targets, and importance. This list may be updated in real-time as new information is received by the system and specific topics may be tracked. The ordered list may also be updated as preferences, targets, and importance are changed, e.g., in a control area of an interface such as the interface 4700 of FIG. 47.

The user interface 4700 may provide the results of the querying to a machine performing a collaborative decision making (CDM) operation and generating at least one CDM result based on the CDM operation. The results can then be combined with possibly one or more interpretations of these results in terms of beliefs and estimations by users and other information gathered from users through an interface such as the interface 4700 of FIG. 47. Responsive to multiple results of the querying plus user interpretation and input, the machine may provide an indication of a ranking corresponding to at least one of the results.

Examples of Implementations Pertaining to Situation Awareness

FIG. 48 illustrates an example of a situation awareness dashboard 4800 in accordance with certain embodiments of the disclosed technology. In the example, the dashboard 4800 provides a listing of current issues that pertain to the user who is logged into the system. As used herein, an "issue" generally refers to a question or question-like topic that usually expresses a user's desire for a certain query or set of queries and analysis thereof. Each issue is identified by a brief textual description, e.g., "Should we hire Des?" and a corresponding answer, e.g., "Yes" with an associated value, e.g., "33%." The listing of answers may be generated through use of any of the techniques described herein and may be updated continuously, e.g., in real-time, or in response to a certain action or passage of time. The issues may be presented in a particular ranking or order.

Each of the listed answers may be displayed in a particular color. For example, red may indicate that there is too little information to support the corresponding answer and, therefore, the user should not necessarily believe the answer to be true and/or accurate. In contrast, an answer highlighted in green may indicate an answer having sufficient information associated therewith to support the answer to a particular extent, e.g., beyond some threshold value.

The dashboard 4800 provides the user with a number of user interaction components. For example, a "Add new issue" control may allow the user to add a new issue to the listing of issues. A "Manage Selected Issue" control, when selected or activated, may provoke the presentation of an issue management interface, such as that illustrated by FIG. 49 and described below. Another control provided by the dashboard 4800, "Selected Issue Details," allows the user to select one or more issues presented in the listing of issues and view certain details concerning the selected issue(s). Selection or activation of a "Search Archived Issues" control may provoke the presentation of a search archives interface, such as that illustrated by FIG. 53 and described below.

Figure 49:
FIG. 49 illustrates an example of an issue management interface in accordance with certain embodiments of the disclosed technology.

FIG. 49 illustrates an example of an issue management interface 4900 in accordance with certain embodiments of the disclosed technology. The interface 4900 may be used by a user to add a new issue or edit an existing issue. Among the many tools and controls that may be provided by the interface 4900 is the ability for the user to specify in what format he or she would like the corresponding answer(s) to be for a certain issue, e.g., yes/no, true/false, good/bad, etc. Another tool provided by the interface 4900 is an "Add information sources" control that, when selected or activated, results in the presentation of an information source interface, such as that illustrated by FIG. 50 and described below. Other controls may allow the user to return to a dashboard, such as the dashboard 4800 of FIG. 48, or exit the issue management interface 4900.

Figure 50:
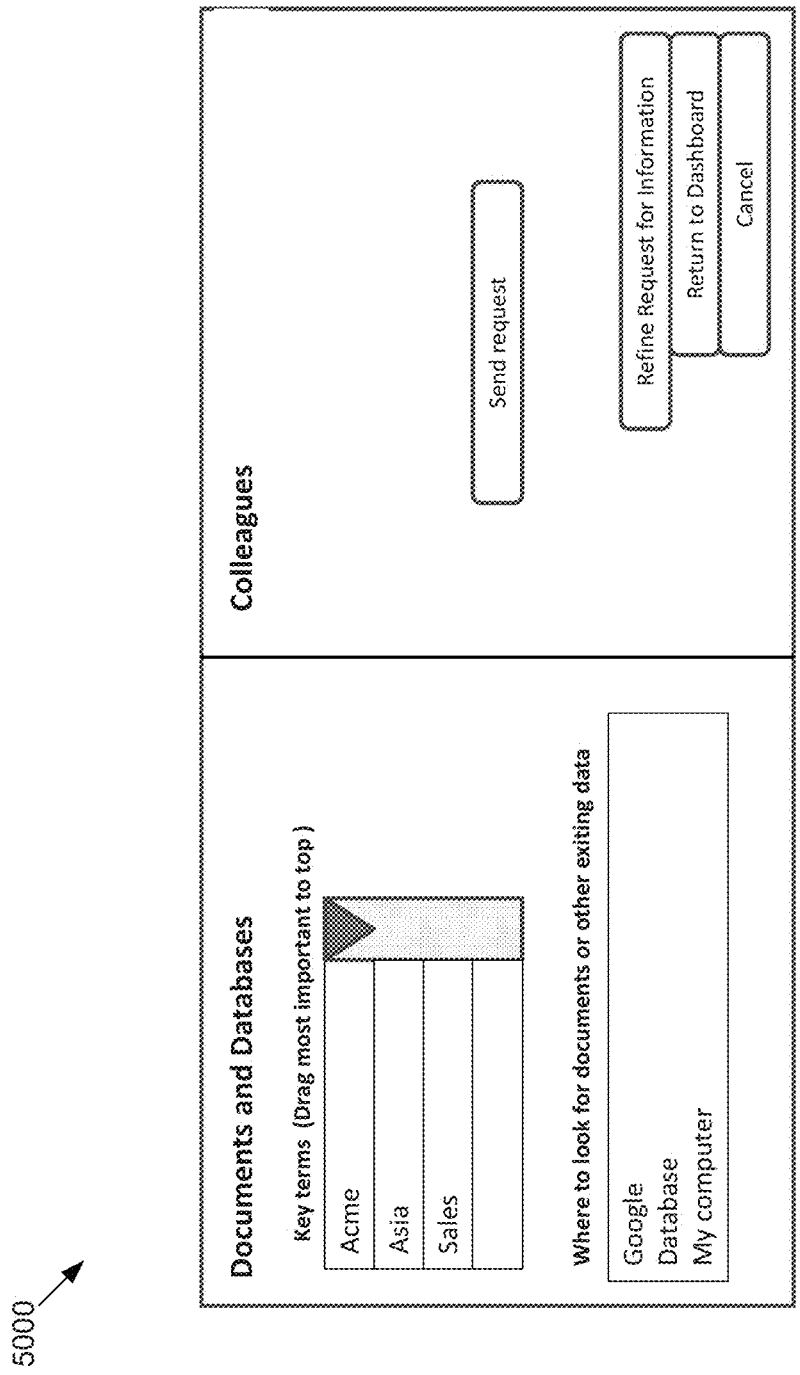
FIG. 50 illustrates an example of an information source interface in accordance with certain embodiments of the disclosed technology.

FIG. 50 illustrates an example of an information source interface 5000 in accordance with certain embodiments of the disclosed technology. The interface 5000 may provide a "Key terms" panel that a user may take advantage of to express an importance associated with one or more of the listed terms. For example, the user may designate a particular term as having the highest importance by dragging the term to the top of the listing. Other suitable mechanisms may be employed by the interface 5000 to allow the user to indicate/edit assigned importance characteristics. The user may also add or remove key terms using drag-and-drop techniques. In the example, the interface 5000 also allows the user to specify one or more information sources against which the system is to perform any of the techniques described above to generate one or more results.

The interface 5000 also provides a "Colleagues" panel that enables the user to perform any of a number of actions involving other users or groups. The user may select another user or group by selecting the corresponding email address in a listing of email addresses, for example. The user may then initiate the sending of a request involving the other user(s). In this manner, the system may retrieve and/or generate multi-user belief data to be used in generating responses to the pertinent issue(s), for example. As with the interface 4900 of FIG. 49, other controls may allow the user to return to a dashboard, such as the dashboard 4800 of FIG. 48, or exit the information source interface 5000.

FIG. 51 illustrates an example of a request for details interface 5100 in accordance with certain embodiments of the disclosed technology. This interface 5100 may allow a user to refine one or more requests for details. For example, the user may define detailed measures, select one or more colleagues for multi-user belief data operations, and specify any of a number of targets and preferences for use in connection with the techniques described above. Once the user has refined the request, he or she may send the request, causing the system to perform any of a number of operations such as those described above.

FIG. 52 illustrates an example of an issue detail interface 5200 in accordance with certain embodiments of the disclosed technology. The interface 5200 is configured to provide a number of results in a "Found data" panel. Each result has associated therewith a textual and/or numerical characteristic, e.g., "Yes" or "10%," along with a certainty, e.g., 90%. For results that do not have sufficient data or certainty, the interface 5200 may provide an indication that evaluation (or further evaluation) is needed.

The interface 5200 also provides a "Colleague inputs" panel that provides, when applicable, pertinent information associated with one or more of the user's colleagues, e.g., as established by using the information source interface 5000 of FIG. 50. Each of the colleague inputs has associated therewith a certainty. Responsive to the user selecting one of the listed colleague inputs, the interface 5200 or other interface may provide a detailed assessment and rationale underlying the corresponding colleague input.

In the example, the interface 5200 also provides an "Archive and Report" control that, when selected or otherwise activated, causes the system to move the issue from an active list to an archived list. The "Archive and Report" control may also allow the user (or others) to provide a rationale for the findings. Selection or activation of the "Archive and Report" control may prompt the presentation of an archive-related interface, such as that illustrated by FIG. 53 and described below, to the user.

Figure 53:
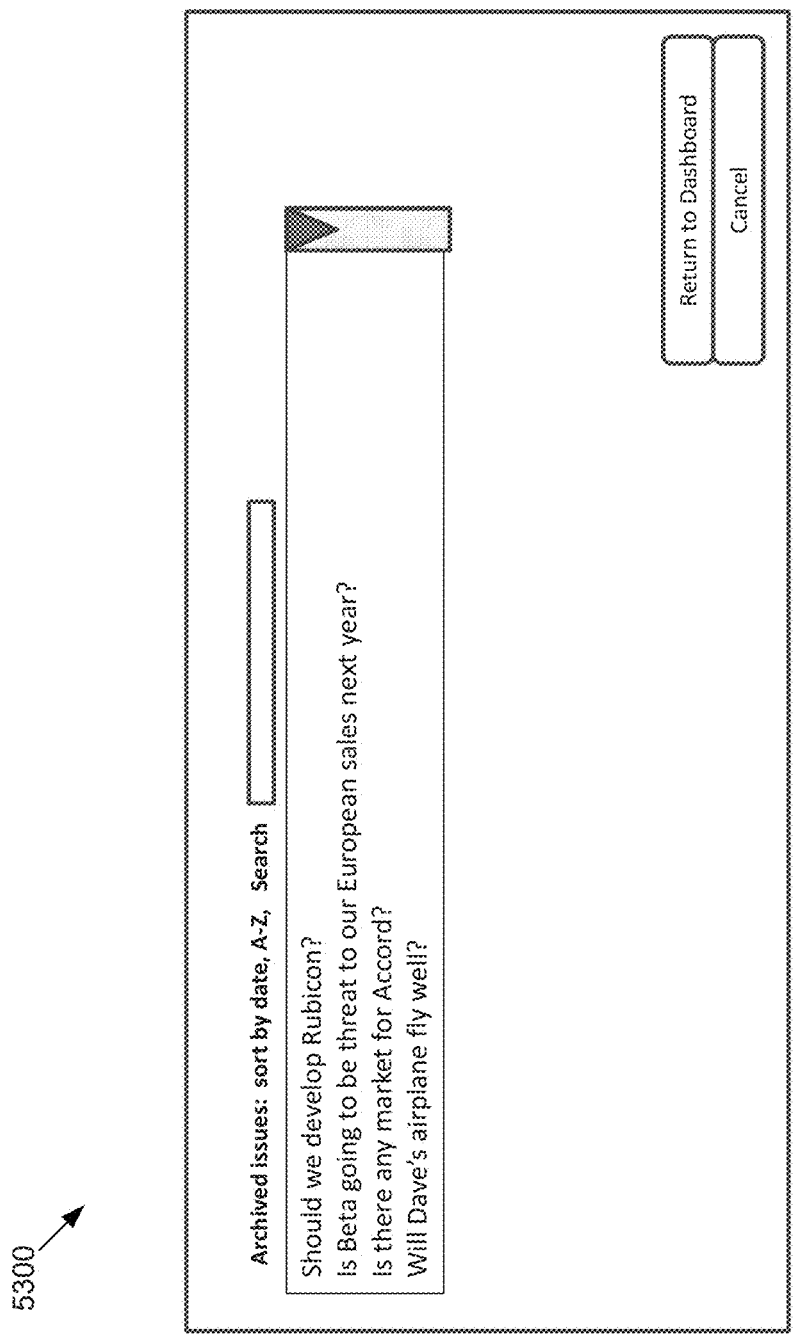
FIG. 53 illustrates an example of a search archives interface in accordance with certain embodiments of the disclosed technology.

FIG. 53 illustrates an example of a search archives interface 5300 in accordance with certain embodiments of the disclosed technology. This interface 5300 may advantageously allow a user to search one or more archived issues. The issues may be displayed in a list and ordered according to any of a number of characteristics such as date archived, amount of information associated therewith, certainty values associated therewith, etc. A search bar may also be provided to enable the user to search the archived issue(s) using keywords or other textual and/or numerical information. Selection of one of the entries in the listing may cause the system to present an issue-related interface, such as the issue management interface 4900 illustrated by FIG. 49 and described above, to the user. A separate control may allow the user to change a status of the selected issue and/or move the issue from the archived issues to the active issues, for example. Also, as with some of the other interfaces described herein, other controls provided by the interface 5300 may allow the user to return to a dashboard, such as the dashboard 4800 of FIG. 48, or exit the present interface 5300.

The invention claimed is:

1. A method performed by a computer, the method comprising:
   storing in a memory, by the computer, information that includes textual information, numerical information, estimate information, and one or more belief maps, wherein the one or more belief maps are based on a criteria satisfaction that has a range from a first parameter to indicate no support to a second parameter to indicate full support and the one or more belief maps that are determined by a formula are further based on a knowledge value that ranges from a first value that indicates uncertainty to a second value that indicates high certainty;
   receiving, by the computer via a network from a user device, one or more user-defined importance conditions, a user-defined belief condition, a user-defined preference condition, wherein the user-defined preference condition indicates a first level of preference of a user for a first aspect of the stored information and a second level of preference of the user for a second aspect of the stored information, and a user-defined target condition that indicates a threshold range for the first aspect of the stored information;
   querying, by the computer, the stored information by application of the user-defined importance condition, a preference probability in relation to the user-defined preference condition, the user-defined belief condition, and the user-defined target condition;
   performing, by the computer, a search operation based on a result of the querying and the queried preference probability to determine whether any parts of the stored information meets the one or more user-defined importance conditions, wherein each user-defined importance condition of the user-defined importance conditions indicates whether a certain aspect of the stored information meets or exceeds a corresponding level of importance to the user;
   generating, by the computer, one or more search results based on the search operation and the formula to find record satisfaction, the record satisfaction is a sum of individual field satisfactions;
   performing, by the computer, a filtering operation based on the result of the querying to determine whether any of the stored information meets the user-defined target condition that indicates a target for a certain aspect of the stored information and a threshold range corresponding to said target;
   generating, by the computer, a filtering result based on the filtering operation;
   performing, by the computer, a matching operation based on the result of the querying;
   generating, by the computer, a matching result based on the result of the querying and the matching operation, wherein the matching operation further comprises: determining, by the computer, whether parts of the stored information meet a user-defined preference level for the first aspect of the stored information over the second aspect of the stored information;
   generating, by the computer, an indication of a ranking correspondence to the one or more search results based on the filtering result, and the matching result; and
   providing, by the computer via the network to the user device, the one or more search results in an order of the ranking, wherein the one or more search results include sequence responses that show a selected amount of difference between the belief maps to allow for a comparison of a large number of responses.

2. The method of claim 1, wherein the first aspect or the second aspect are each related to a user-defined importance level.

3. The method of claim 1, wherein the user-defined target condition indicates a target for a first aspect of the stored information and a threshold range corresponding to the target.

4. The method of claim 3, wherein the search result, filtering result, or matching result comprises a value within the threshold range or a value that is substantially equal to the target.

5. The method of claim 1, wherein the user-defined preference condition comprises a plurality of conditions having corresponding satisfaction values or the user-defined target condition comprises a plurality of conditions having corresponding satisfaction values.

6. The method of claim 5, wherein the plurality of conditions are ranked according to the corresponding satisfaction values.

7. The method of claim 1, wherein the belief map comprises representation of a statement corresponding to a user and the representation is associated with a belief certainty.

8. The method of claim 7, wherein the belief certainty is provided by an automatic tagging process.

9. The method of claim 1, wherein the estimate information comprises an estimation certainty.

10. The method of claim 9, wherein the estimation certainty is based on a representation of a statement corresponding to a user.

11. The method of claim 9, wherein the estimation certainty is provided by a user via a user interface.

12. The method of claim 9, wherein the estimation certainty is provided by an automatic tagging process.

13. A computer comprising:
   a memory; and
   a computer processor configured to:
   store in the memory information that includes textual information, numerical information, estimate information, and one or more belief maps, wherein the one or more belief maps are based on a criteria satisfaction that has a range from a first parameter to indicate no support to a second parameter to indicate full support, and the one or more belief maps that are determined by a formula are further based on a knowledge value that ranges from a first value that indicates uncertainty to a second value that indicates high certainty;
   receive via a network from a user computer one or more user-defined importance conditions, a user-defined belief condition, a user-defined preference condition, wherein the user-defined preference condition indicates a first level of preference of a user for a first aspect of the stored information and a second level of preference of the user for a second aspect of the stored information, and a user-defined target condition that indicates a threshold range for the first aspect of the stored information;
   query the stored information by application of the user-defined importance condition, a preference probability in relation to the user-defined preference condition, the user-defined belief condition, and the user-defined target condition;

perform a search operation based on a result of the querying and the queried preference probability to determine whether any parts of the stored information meets the one or more user-defined importance conditions, wherein each user-defined importance condition of the user-defined importance conditions indicates whether a certain aspect of the stored information meets or exceeds a corresponding level of importance to the user;

generate one or more search results based on the search operation and the formula to find record satisfaction, the record satisfaction is a sum of individual field satisfactions;

perform a filtering operation based on the result of the querying to determine whether any of the stored information meets the user-defined target condition that indicates a target for a certain aspect of the stored information and a threshold range corresponding to said target;

generate a filtering result based on the filtering operation;

perform a matching operation based on the result of the querying;

generate a matching result based on the result of the querying and the matching operation, wherein the matching operation further comprises: determine whether parts of the stored information meet a user-defined preference level for the first aspect of the stored information over the second aspect of the stored information;

generate an indication of a ranking corresponding to the one or more search results based on the filtering result, and the matching result; and provide via the network to the user computer, the one or more search results in an order of the ranking, wherein the one or more search results include sequence responses that show a selected amount of difference between the belief maps to allow for a comparison of a large number of responses.

14. The computer of claim 13, wherein the first aspect or the second aspect are each related to a user-defined importance level.

15. The computer of claim 13, wherein the user-defined target condition indicates a target for a first aspect of the stored information and a threshold range corresponding to the target.

16. The computer of claim 15, wherein the search result, filtering result, or matching result comprises a value within the threshold range or a value that is substantially equal to the target.

17. The computer of claim 13, wherein the user-defined preference condition comprises a plurality of conditions having corresponding satisfaction values or the user-defined target condition comprises a plurality of conditions having corresponding satisfaction values.

18. The computer of claim 17, wherein the plurality of conditions are ranked according to the corresponding satisfaction values.

19. The computer of claim 13, wherein the belief map comprises representation of a statement corresponding to a user and the representation is associated with a belief certainty.

20. The computer of claim 19, wherein the belief certainty is provided by an automatic tagging process.

21. The computer of claim 13, wherein the estimate information comprises an estimation certainty.

22. The computer of claim 21, wherein the estimation certainty is based on a representation of a statement corresponding to a user.

23. The computer of claim 21, wherein the estimation certainty is provided by a user via a user interface.

24. The computer of claim 21, wherein the estimation certainty is provided by an automatic tagging process.

* * * * *